United States Patent [19]
Yousefi et al.

[11] Patent Number: 5,787,149
[45] Date of Patent: Jul. 28, 1998

[54] METHOD AND APPARATUS FOR MANAGING REMOTELY LOCATED DOCUMENT PRODUCING MACHINES BY USING CELLULAR RADIOS

[75] Inventors: Cid Yousefi, Miami; Christopher E. BoVee, Hollywood; Nello Filippone, Miami; Robert Moore, Coral Gables, all of Fla.

[73] Assignee: Equitrac Corporation, Coral Gables, Fla.

[21] Appl. No.: 558,884

[22] Filed: Nov. 16, 1995

[51] Int. Cl.$^6$ .................................................. H04Q 7/00
[52] U.S. Cl. .................................................. 379/59
[58] Field of Search .................................. 379/58, 59

[56] References Cited

U.S. PATENT DOCUMENTS

| | | |
|---|---|---|
| 4,167,322 | 9/1979 | Yano et al. |
| 4,213,694 | 7/1980 | Kuseski |
| 4,330,847 | 5/1982 | Kuseski |
| 4,455,453 | 6/1984 | Parasekvakos et al. |
| 4,497,037 | 1/1985 | Kato et al. |
| 4,501,485 | 2/1985 | Tsudaka |
| 4,549,044 | 10/1985 | Durham |
| 4,583,834 | 4/1986 | Seko et al. |
| 5,016,059 | 5/1991 | Smeiman |
| 5,038,319 | 8/1991 | Carter et al. |
| 5,057,866 | 10/1991 | Hill, Jr. et al. |
| 5,077,582 | 12/1991 | Kravette et al. |
| 5,084,875 | 1/1992 | Weinberger et al. |
| 5,184,179 | 2/1993 | Tarr et al. |
| 5,214,772 | 5/1993 | Weinberger et al. |
| 5,333,286 | 7/1994 | Weinberger et al. |
| 5,361,265 | 11/1994 | Weinberger et al. |
| 5,398,257 | 3/1995 | Groenteman |
| 5,526,401 | 6/1996 | Roach, Jr. et al. |
| 5,530,736 | 6/1996 | Comer et al. |
| 5,546,444 | 8/1996 | Roach, Jr. et al. |
| 5,594,740 | 1/1997 | LaDue et al. |

OTHER PUBLICATIONS

Electronic Data Interface Operator Guide for Xerox 1090 Copier, Version 1.0, and EDI Kit Installation Instructions (Nov. 1988).
Intellimeter Corporation Company Overview (Feb. 1994).
Nexis printout of "BellSouth Announces New Wireless Technology," *Telecommunications Alert*, 12(145):no page number given (Jul. 27, 1995).
Nexis printout of "BellSouth Debuts 'Cellemetry' for Receiving. Transmititng Data," *Telco Business Report*, 12(17):no page number given (Aug. 14, 1995).
Nexis printout of "BellSouth Debuts Technology for Telemetry Employing Cellular Control Channels," *En Route Technology*, 4(15):no page number given (Jul. 31, 1995).
Nexis printout of "BellSouth Developing Meter–Reading Service," *Telecommunications Alert*, 12(222):no page number given (Nov. 13, 1995).
Nexis printout of "BellSouth Prepares Telemetry Service," *Telecommunications Alert*, 12(149):no page number given (Aug. 2, 1995).

(List continued on next page.)

*Primary Examiner*—William Cumming
*Attorney, Agent, or Firm*—Morrison & Foerster

[57] ABSTRACT

A method and apparatus for managing remotely located document-producing machines by using cellular technology. One embodiment of the invention is an apparatus that includes a central computer, a central cellular radio station, and a number of remote document-producing nodes. The central computer generates a copier management command directed towards a selected one of the remote document-producing nodes, and supplies this command to the central cellular radio station. This radio station then uses a central cellular radio to relay the copier management command to the selected remote copier node. Alternatively, in another embodiment of the invention, a remote document-producing node initiates a remote management operation by transmitting management data to the central cellular station.

38 Claims, 15 Drawing Sheets

OTHER PUBLICATIONS

Nexis printout of "BellSouth Puts a New Slant on Wireless Data Service; BellSouth Corp.'s Cellemetry Service," *Telephony*, 229(5):6 (Jul. 31, 1995).

Nexis printout of "BellSouth Rolls Out 'Cellemetry' Technology to Challenge Packet Data Networks for Telemetry Applications," *Wireless Data News*, 3(16):no page number given (Aug. 9, 1995).

Nexis printout of "BellSouth Rolls Out New Cellemetry Technology," *Mobile Phone News*,13(32): no page number given (Aug. 7, 1995).

Nexis printout of "BellSouth Testing CDPD Altenative for Telemetry Applications," *Advanced Wireless Communications*, 6(16):no page number given (Aug. 2, 1995).

Nexis printout of "Interactive Home's Monthly News Digest," *Interactive Home*, No. 60 (Aug. 1995).

Nexis printout of "New BellSouth Technology Offers Economical Way to Read Meters, Track Vending Inventory Wirelessly; BellSouth Test Under Way in Indianapolis," *PR Newswire* (Jul. 25, 1995).

Nexis printout of "News Shorts," *Computerworld*, p. 8 (Jul. 31, 1995).

Nexis printout of "Utility, Appliance Tracking Is Tested," *The Commercial Appeal (Memphis)*, p. 4B (Jul. 26, 1995).

Nexis printout of "Untitled," *Communications Daily*, 15(143):8 (Jul. 26, 1995).

Lindley, "Xerox unveils copier that phones for help," *Rochester Democrat and Chronicle* (Mar. 28, 1990).

Press Release Issued by Intellimeter Corporation Entitled, Intellimeter Corporation Acquires Utility Telemetering, Vending and Copier Monitor Business for Metering Services Inc. (Pleasanton, CA, Aug. 31, 1993).

Press Release Issued by Roger's Cantel Inc. Entitled "Rogers CANTEL, Inc. and Telemeter Corporation Announce Wireless Utility Metering Services in Canada" (Toronto, Ontario, Canada, Sep. 7, 1993).

Press Release Issued by Telemeter Corporation Entitled, "Wireless Utility Information System announced at Sixth Annual AMRA Symposium" (Toronto, Canada, Sep. 26–29, 1993).

Product Brochure for Telemeter AMR and DSM System, Telemeter Corporation.

Product Brochure for Teleassistance NETWORK, Copyright, Eastman Kodak Company, Rochester, NY 1986.

Product Brochure for The Copier Monitor, Intellimeter Corporation, 1994.

Product Brochure for the Intellimeter Commercial Submetering product, Copyright, Intellimeter Corporation, 1244 Quarry Lane, Pleasanton, CA 94566, 1993.

Product Brochure for the Intellimeter System, Copyright, Intellimeter Corporation, 1244 Quarry Lane, Pleasanton, CA 94566, 1993.

Product Brochure for The Register, Telemeter Corporation, 1244 Quarry Lane, Plesanton, CA 94566.

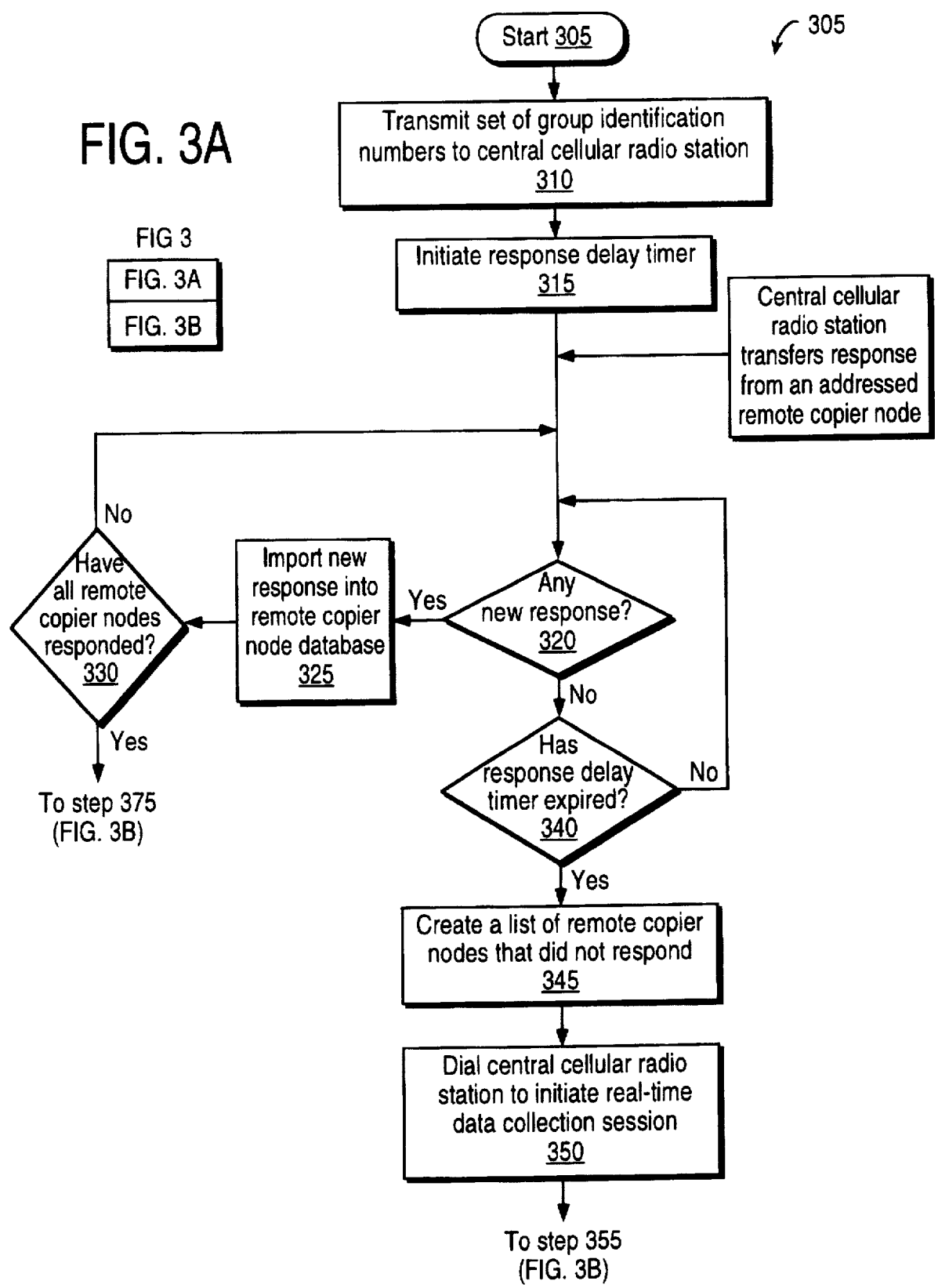

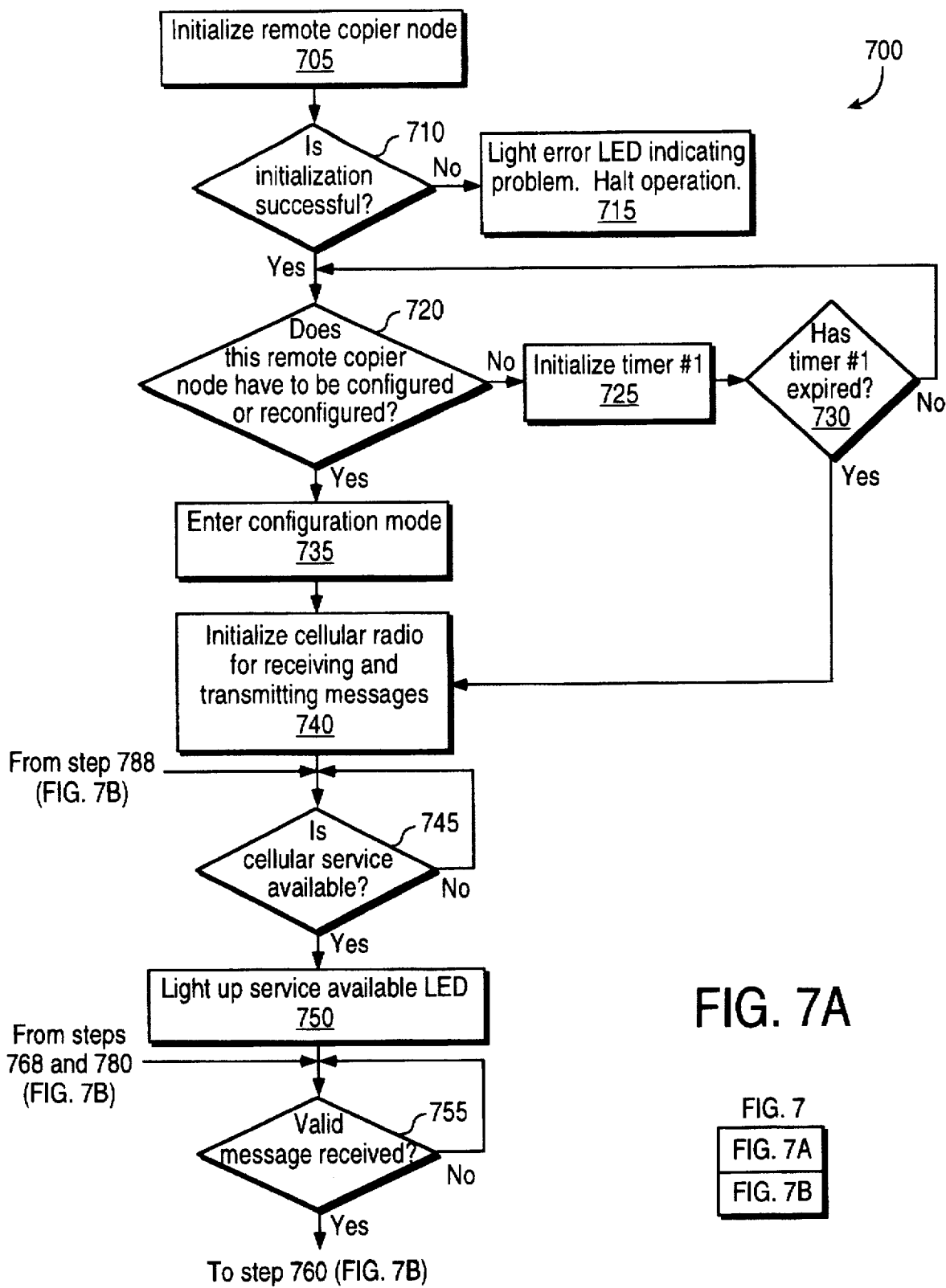

| FIG. 8A |
|---|
| FIG. 8B |

METHOD AND APPARATUS FOR MANAGING REMOTELY LOCATED DOCUMENT PRODUCING MACHINES BY USING CELLULAR RADIOS

The present invention is directed towards a method and apparatus for managing remotely located document-producing machines by using cellular radios.

BACKGROUND OF THE INVENTION

Typically, the rent and maintenance fee that a copier vendor charges its lessee is dependent on the number of copies made by the lessee. Vendors typically use internal meters, that connect to copiers, to count the number of copies produced by their leased copiers. Vendors then typically bill their clients by manually (1) reading their internal meters to collect billing data, and (2) entering the collected meter count data in computers for processing the data. This process of manually collecting and processing meter data is very time consuming, labor intensive, and error prone.

Under another prior art approach, a number of internal copier meters transmit their metered copy count data via local power lines to a local, Mobitex packet switched radio network interface. On a scheduled billing day, this local interface then transmits the copy count data to the vendor, by using a RAM or Cantel Mobitex packet switched is radio network. Unfortunately, this prior art approach is rather expensive because of the costs associated with the supporting equipment of the Mobitex packet switched radio network.

Consequently, there is a need in the art for a copier meter count collection system that enables a central computer to collect copy count data from a number of remotely located copiers. Ideally, this system should also enable the central computer to obtain copier status information from the remote copiers, in order to improve the quality of service and maintenance provided by copier vendors. Therefore, there is also a need in the art for a method and apparatus for managing remote document-producing machines from a central computer.

SUMMARY OF THE INVENTION

The invention provides a method and apparatus for managing remotely located document-producing machines by using cellular radios. One embodiment of the invention is an apparatus that includes a central computer, a central cellular radio station, and a number of remote document-producing nodes. The central computer generates a node management command directed towards a selected one, or a selected set, of the remote nodes. The central computer then supplies this command to the central cellular radio station.

This radio station has a central cellular radio for transmitting and receiving communications to the remote nodes. Consequently, upon receiving the management command from the central computer, this station uses its cellular radio to broadcast this command to the selected remote node or nodes. If the management command is a request for a specific type of information, an addressed remote node then transmits this information to the central computer via the central cellular radio. Alternatively, in another embodiment of the invention, a remote document-producing node initiates a remote management operation by transmitting management data to the central cellular station.

One embodiment of a remote node includes (1) a document-producing machine (such as a copy machine, a printing machine, a facsimile machine, a stamp generating machine, etc.), (2) a document-counting circuit coupled to the document-producing machine, and (3) a remote cellular radio coupled to the document-counting circuit. The document-counting circuit maintains a count of document outputs produced by the document-producing machine. Specifically, every time the document-producing machine produces a unit of output (e.g., every time it produces a copied page, a printed page, a faxed paged, a stamp, etc.), the document-producing machine supplies a count pulse to the document-counting circuit, in order to cause it to increment the document output count by one.

The document-counting circuit also receives node management commands from the remote cellular radio, in order to respond to these commands. For example, when the document-counting circuit receives a document output count management command, it supplies the document output count to the remote cellular radio, which, in turn, relays this data to the central computer via the central cellular radio station.

BRIEF DESCRIPTION OF THE DRAWINGS

The novel features of the invention are set forth in the appended claims. However, for purpose of explanation, one embodiment of the invention is set forth in the following figures.

DETAILED DESCRIPTION OF THE INVENTION

The invention provides a method and apparatus for managing remotely located document-producing machines by using cellular radios. In the following description, numerous details are set forth for purpose of explanation. However, one of ordinary skill in the art would realize that the invention may be practiced without the use of these specific details. For example, although the description below relates to a method and apparatus for managing remotely located copiers, one of ordinary skill in the art would realize that the invention can also be used to manage other remotely located document-producing machines (such as printers, facsimile machines, stamp generating machines, etc.). In other instances, well-known structures and devices are shown in block diagram form in order not to obscure the description of the invention with unnecessary detail.

Figure 1:
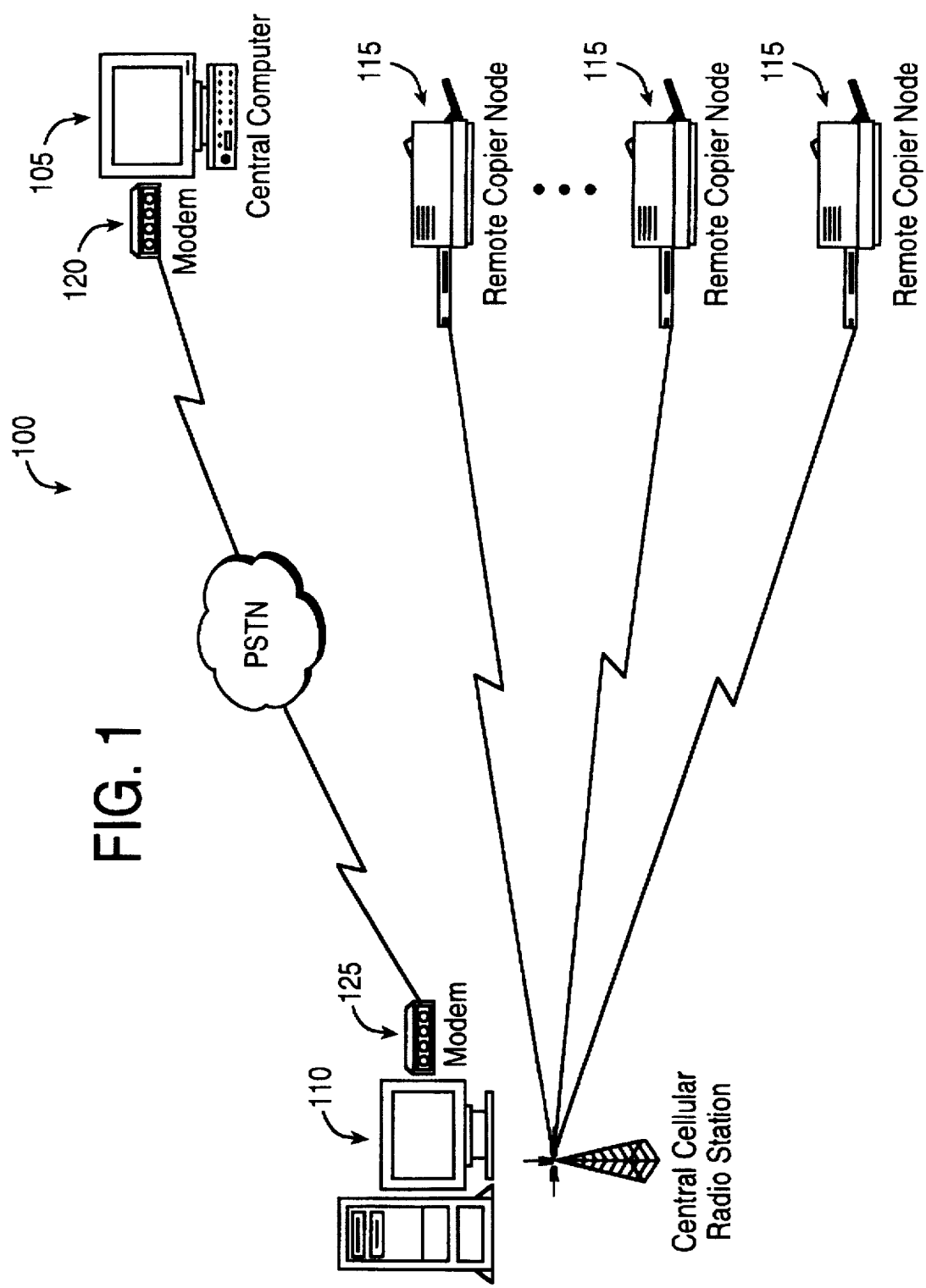
FIG. 1 presents one embodiment of the invention's apparatus for managing remotely located copier nodes from a central computer by using cellular radios.

FIG. 1 presents a diagram of one embodiment of the invention's apparatus for managing remotely located copiers by using cellular radios. Copier management system 100 of FIG. 1 includes a central computer 105, a central cellular radio station 110, and a number of remote copier nodes 115. Central computer 105 generates a copier management command directed towards a selected one, or a selected set, of the remote copier nodes. Two examples of copier management commands are (1) a request for the number of copies produced by the copier at the selected copier node, and (2) a request for the status of the selected copier node (e.g., an inquiry regarding the toner or paper level of the copier at the selected node).

Central computer 105 then supplies this command to central cellular radio station 110. As shown in FIG. 1, in one embodiment of the invention, central computer 105 uses modems 120 and 125 to transmit the copier management command to the central cellular radio station 110 via public telephone lines. However, one of ordinary skill in the art would realize that, in alternative embodiments of the invention, the central computer communicates to the central radio station by using alternative means (such as an internet connection or a dedicated T1 line).

Central cellular radio station 110 includes a central cellular radio. This radio transmits and receives communications to and from the remote copier nodes. Consequently, after receiving the copier management command from central computer 105, central cellular radio station 110 uses its radio to relay this command to the selected remote copier node or nodes. If the copier management command is a request for a specific type of information, each selected remote copier node then transmits this information to the central computer via the central cellular radio.

Figure 11:
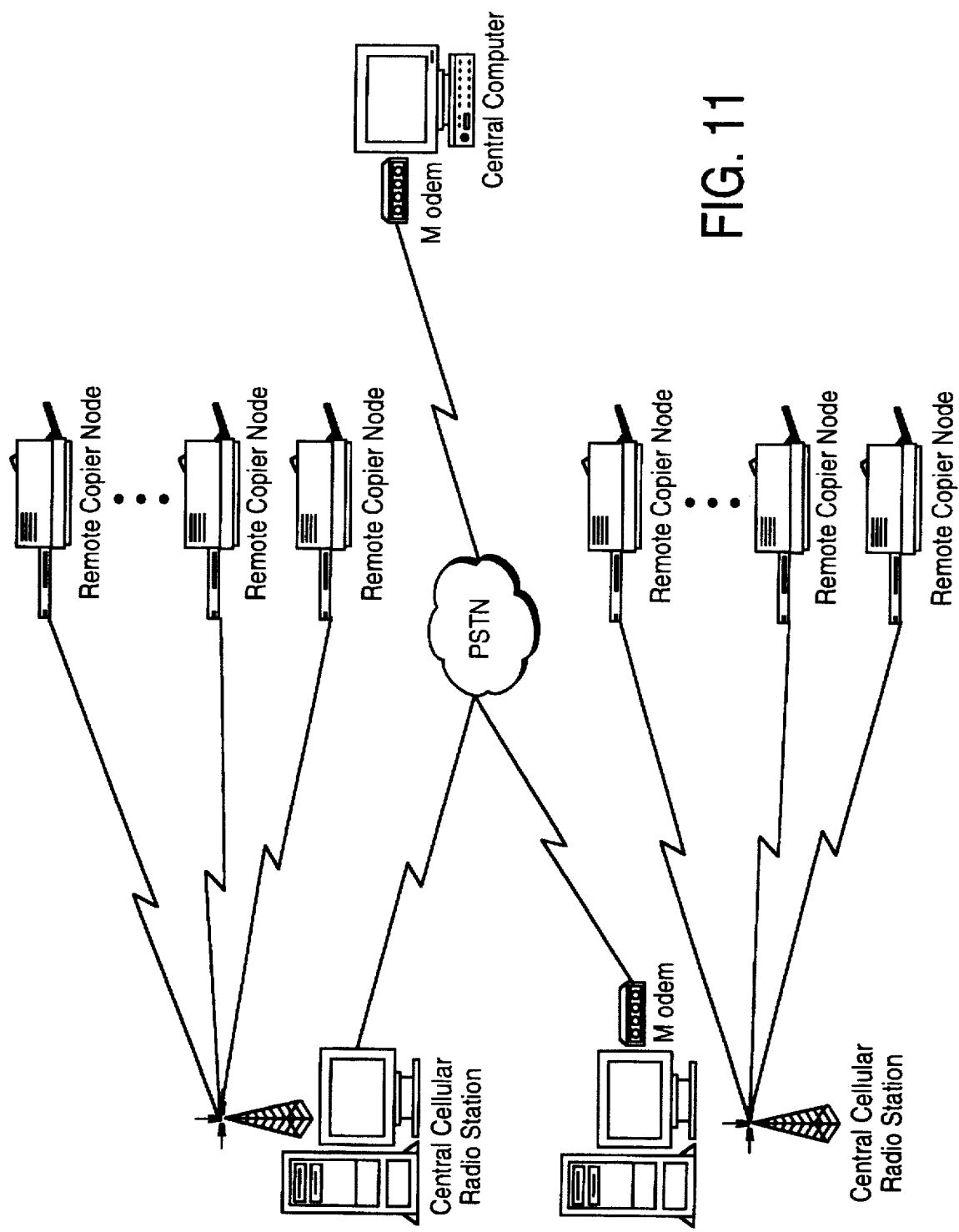
FIG. 11 presents another embodiment of the invention's apparatus for managing remotely located copier nodes from the central computer by using cellular radios.

Although one embodiment of the invention's apparatus has been described with reference to FIG. 1, one of ordinary skill in the art would recognize that numerous alternative embodiments of the invention's apparatus exist. For example, FIG. 11 sets forth another embodiment of the invention's apparatus for managing remotely located copiers by using cellular radios. As shown in this figure, this embodiment of the invention utilizes a second central cellular radio station to connect the central computer to a second set of remote copier nodes.

A. The Central Computer

Figure 2:
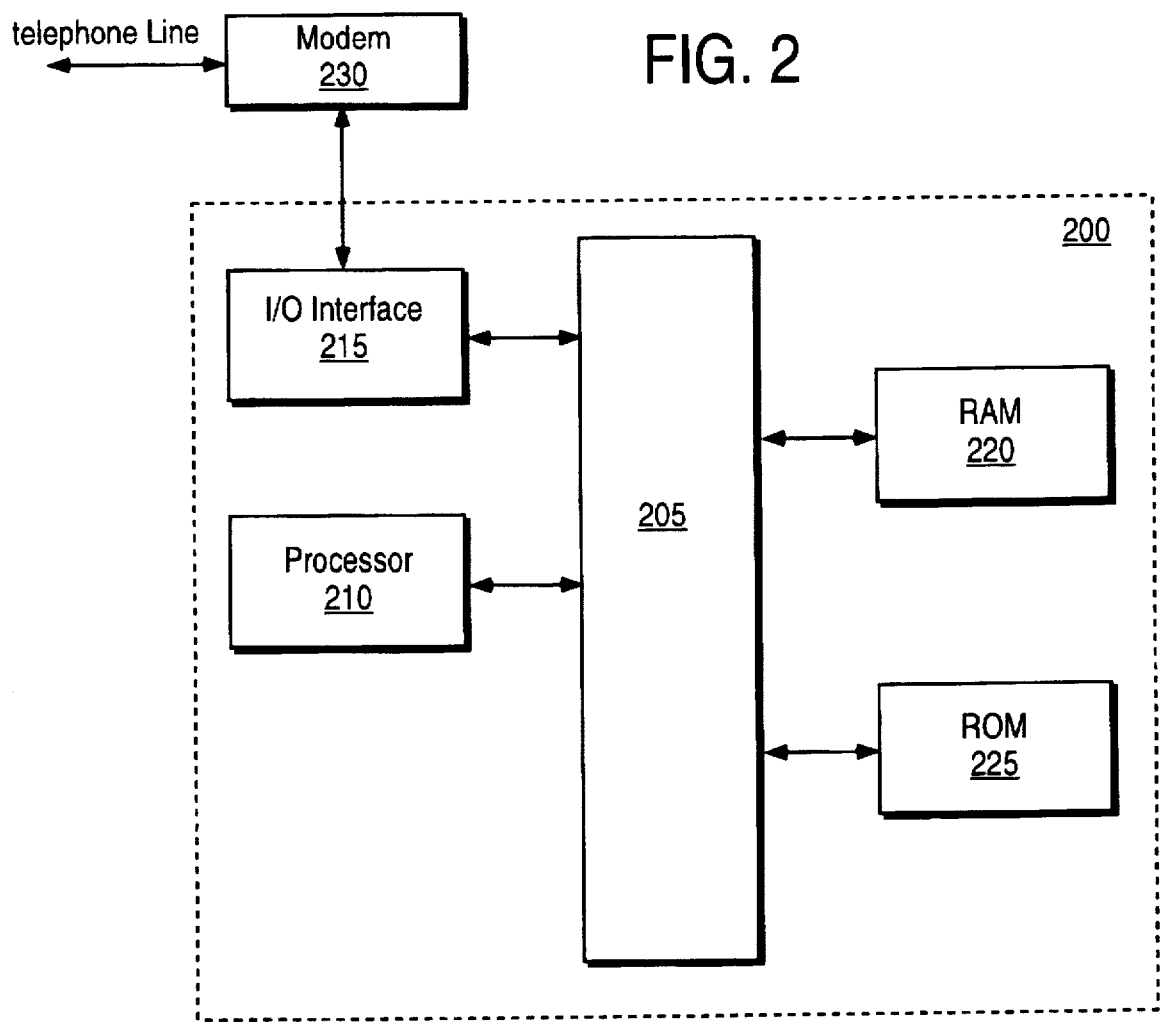
FIG. 2 presents one embodiment of the central computer.

FIG. 2 presents one embodiment of central computer 105 of FIG. 1. This computer is responsible for collecting raw transaction data from all remote copier nodes. In particular, in one embodiment of the invention, a data collection service uses the central computer (1) to collect copier count data for its vendor cliental, (2) to sort and group copy count data by site and subscribing vendor, and (3) to electronically transfer this data to its subscribers. In addition, in alternative embodiments of the invention, the central computer not only collects and segregates data for each of its subscribing vendors, but also prepares the billing statements for its subscribers.

As shown in FIG. 2, central computer 200 includes internal bus 205, processor 210, input/output (I/O) interface 215, random access memory (RAM) 220, and read-only memory (ROM) 225. Bus 205 collectively represents all of the communication lines that connect the numerous internal modules of computer 200. In addition, this computer utilizes processor 210 for processing digital signals, and thereby managing the operation of the computer.

Furthermore, computer 200 includes I/O interface 215, which serves as a latch for data that is transmitted between internal bus 205 and external devices (such as the central cellular radio station and the remote copier nodes) via modem 230. In one embodiment of the invention, I/O interface 215 adjusts the data timing, the data width, or both, prior to relaying the data to the internal bus or the external devices. I/O interface 215 can be either a serial or a parallel interface.

Moreover, external modem 230 modulates and demodulates data signals in the voice band frequencies, prior to transmitting data signals to the central cellular radio station and the I/O interface. In addition, although FIG. 2 presents a central computer connected to an external modem, one of ordinary skill in the art would understand that an alternative embodiment of the invention utilizes a central computer with an internal modem. One of ordinary skill in the art would also recognize that alternative embodiments of central computer 200 communicate to the central radio station by utilizing alternative communication means (such as a dedicated network or a radio).

Central computer 200 also includes RAM 220 for storing temporary variables or other intermediate information during the operation of processor 210. In one embodiment of the invention, computer 200 also utilizes RAM 220 to store a source code necessary for the operation of the invention (i.e., computer 200 utilizes the software residing in RAM 220 to direct the invention's remote management operation by guiding the actions of processor 210). In another embodiment of the invention, the firmware instructions (i.e., the source code) residing in ROM 225 direct the invention's remote management operation.

Figure 3B:
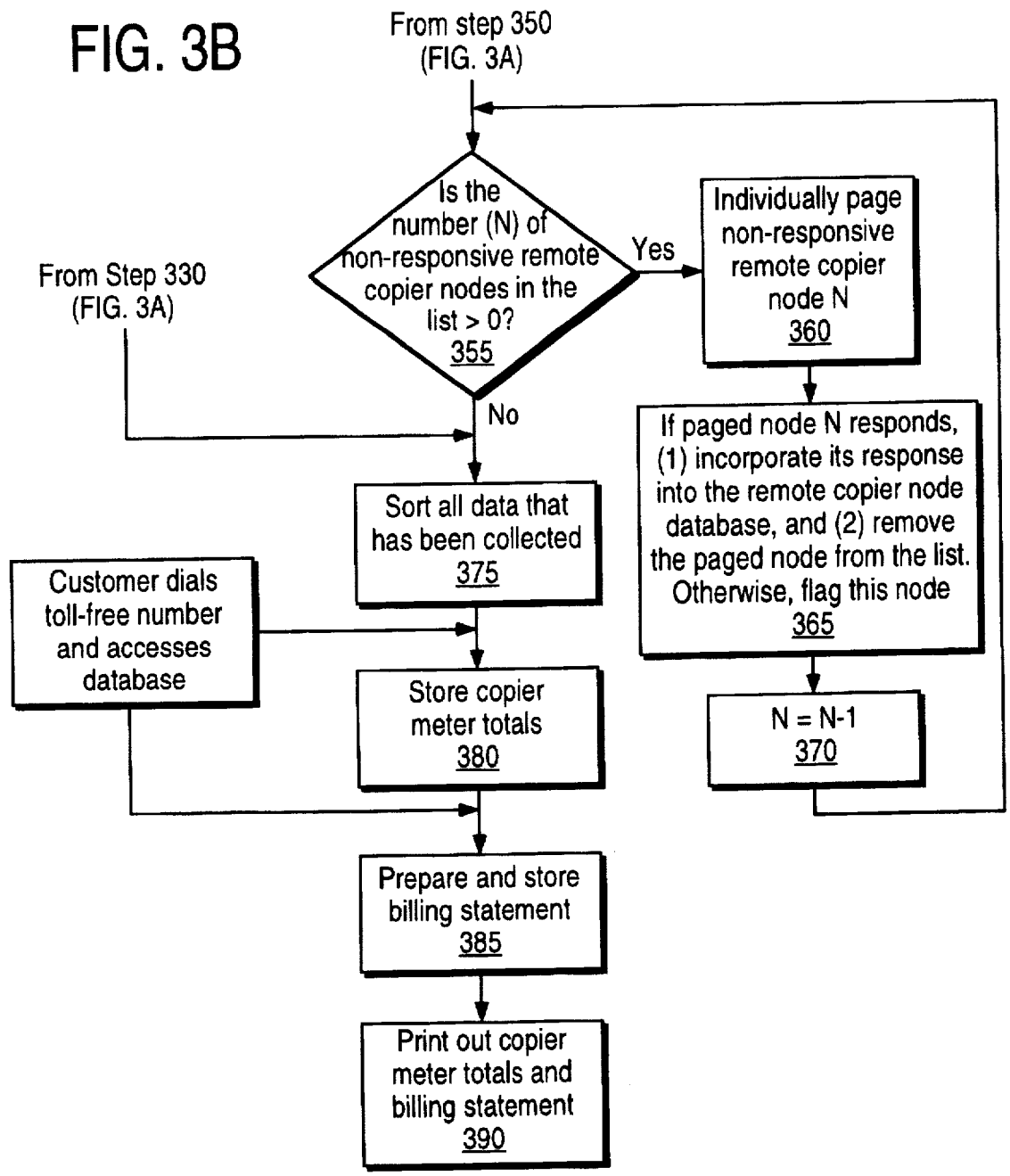
FIG. 3 presents one embodiment of the instructions for directing the operation of a processor of the central computer, during a meter count collection operation.

FIG. 3 presents one embodiment of the instructions for directing the operation of processor 210 during a meter count collection operation. The initial step of this figure's flowchart is the start step 305. At this step, the process starts at a pre-specified date and time. For example, in one embodiment of the invention, process 300 restarts every twenty four hours, in order to collect daily meter count data from the remote copier nodes. The process then transitions to step 310, during which computer 200 initiates a delayed meter collection process by transmitting a set of group identification numbers to the central cellular radio station. Each group identification number identifies one or more remote copier nodes, whose meter count data the central computer is requesting.

Specifically, as further discussed below, each remote copier node has a remote cellular radio, which is identified by at least one group identification number and one individual identification number. In addition, in one embodiment of the invention, the identification numbers are manufacturer identification numbers (MINs) that are assigned to the remote cellular radio, by its manufacturer or by an operator that configures the radio. Moreover, in one embodiment of the invention, computer 200 transmits the MINs to the central cellular radio station, by using modem 230 and a public switched telephone network (i.e., computer 200 dials the central station's telephone number and downloads the MINs). However, one of ordinary skill in the art would realize that the central computer could access the central radio station by using alternative means (such as an indirect internet connection established through a modem and an external server, or a direct connection established through a dedicated T1 line).

From step 310, the process transitions to step 315, during which the process initiates a response delay timer. This timer is either a count up or a count down timer that expires when it reaches a predetermined value. In addition, this response delay timer is used to signal when a delay interval, during which the remote copier nodes must respond, has expired.

The process then transitions to step 320. At this step, the process determines if the central computer has received any new responses from an addressed remote copier node via the central cellular radio station. In one embodiment of the invention, the central cellular radio station relays responses from a node to the computer by sending E-mail to the computer. However, one of ordinary skill in the art would recognize that the central station could utilize an alternative public or dedicated network to relay responses to the central computer (e.g., the station could directly call the computer via a public switched telephone network or could utilize a dedicated T1 line).

If, at step 320, the process detects that the central computer has received a new response from an addressed remote copier node, the process transitions to step 325. At this step, the process imports the new response into a remote copier node database. From step 325, the process transitions to step 330, during which the process determines if all of the addressed remote nodes have responded. If a determination is made that all of the addressed nodes have not responded, the process transitions back to step 320. However, if all of the addressed nodes have responded, the process then transitions to step 375 to begin sorting responses by site for each subscribing vendor.

On the other hand, if (at step 320) the process does not detect the reception of a new response, the process transitions to step 340, during which a decision is made as to the status of the response delay timer. If this timer has not expired (i.e., if the non-responsive addressed nodes still have time to respond), the process transitions back to step 320 to wait for additional responses. However, if (at step 340) the process determines that the response delay timer has expired, the process transitions to step 345. At this step, the process creates a list of remote copier nodes that did not respond to the delayed group addressing.

The process then transitions to step 350, in order to initiate a real-time data collection session over a dedicated communication channel. In one embodiment of the invention, the central computer dials a toll-free telephone number of the central cellular radio station, which establishes successive real-time collection sessions (utilized during step 360) between the central computer and the non-responsive remote copier nodes. However, one of ordinary skill in the art would understand that, in alternative embodiments of the invention, the central computer utilizes alternative dedicated communication means (such as a dedicated T1 line) to access the central cellular radio station during a real-time collection session.

From step 350, the process then transitions to step 355. At this step, the process determines if the number (N) of non-responsive remote copier nodes in the non-responsive list is greater than zero. If so, the process transitions to step 360, during which the central computer requests the central radio station to individually page non-responsive remote copier node N. If the non-responsive copier node N responds to this individual page, then the process (1) incorporates its response into the remote copier node database, and (2) removes this paged node N from the non-responsive list. However, if node N does not respond, the process flags this node for inspection. After step 365, the process transitions to step 370, where it decrements the non-responsive count by one, and then transitions back to step 355.

When the number of non-responsive remote copier nodes reaches zero, the process transitions from step 355 to step 375. At this step, the process sorts meter count collection responses for each of its subscribing vendors. The process then transitions to step 380, during which the sorted responses are stored. From this step, the process transitions to step 385 to prepare for each subscribing vendor a billing statement based on the collected meter count data and to store each generated billing statement. As shown in FIG. 3, the customer can retrieve the stored meter collection data or billing statement by dialing a tool-free number and accessing the appropriate databases. Alternatively, as shown in step 390, the process can provide a printout of each remote copier node's meter count data and/or provide a printout of the billing statement, for each subscribing vendor.

In alternative embodiments of the invention, the steps of process 300 of FIG. 3 direct the central computer to perform alternative remote management operations. For example, in one embodiment of the invention, a process analogous to process 300 is used (1) to order the remote copier nodes to perform an operation (such as an operation for enabling the remote copier node, for disabling the remote copier node, or for resetting the remote copier node), and (2) to respond with an acknowledge signal after performing the operation. Moreover, in another embodiment of the invention, process 300 is used to obtain status data (such as the toner or paper level) from the remote copier nodes.

For these alternative embodiments of the invention, one embodiment of process 300 not only transmits identification numbers at step 310, but also transmits a management command at this step. This is because, in one embodiment of the invention, the remote copier nodes reply with meter count data when they only receive their identification numbers. Consequently, in order to perform alternative remote management operations, one embodiment of process 300 transmits a management command along with, or after, a transmitted identification number, at step 310.

Alternatively, another embodiment of process 300 performs several remote management operations by only transmitting identification numbers (without transmitting any management commands) corresponding to the remote management operations. In other words, one embodiment of process 300 not only performs a meter count collection operation by transmitting an identification number stored by selected nodes as a meter count request identification number, but also performs at least another particular management operation by transmitting an identification number stored by selected nodes as a request identification number for the particular management operation. Thus, once a selected node decodes the received signal to determine that it is a request identification number for a particular management operation, the selected node performs the requested management operation (and replies to the central computer, if it is required to do so). For example, under this approach, process 300 would obtain status data regarding the toner level at selected copier nodes by (1) transmitting the identification number stored at the selected node as a request for this status data, and (2) waiting for the selected node to decode this identification number in order to supply it with the requested data.

Figure 4:
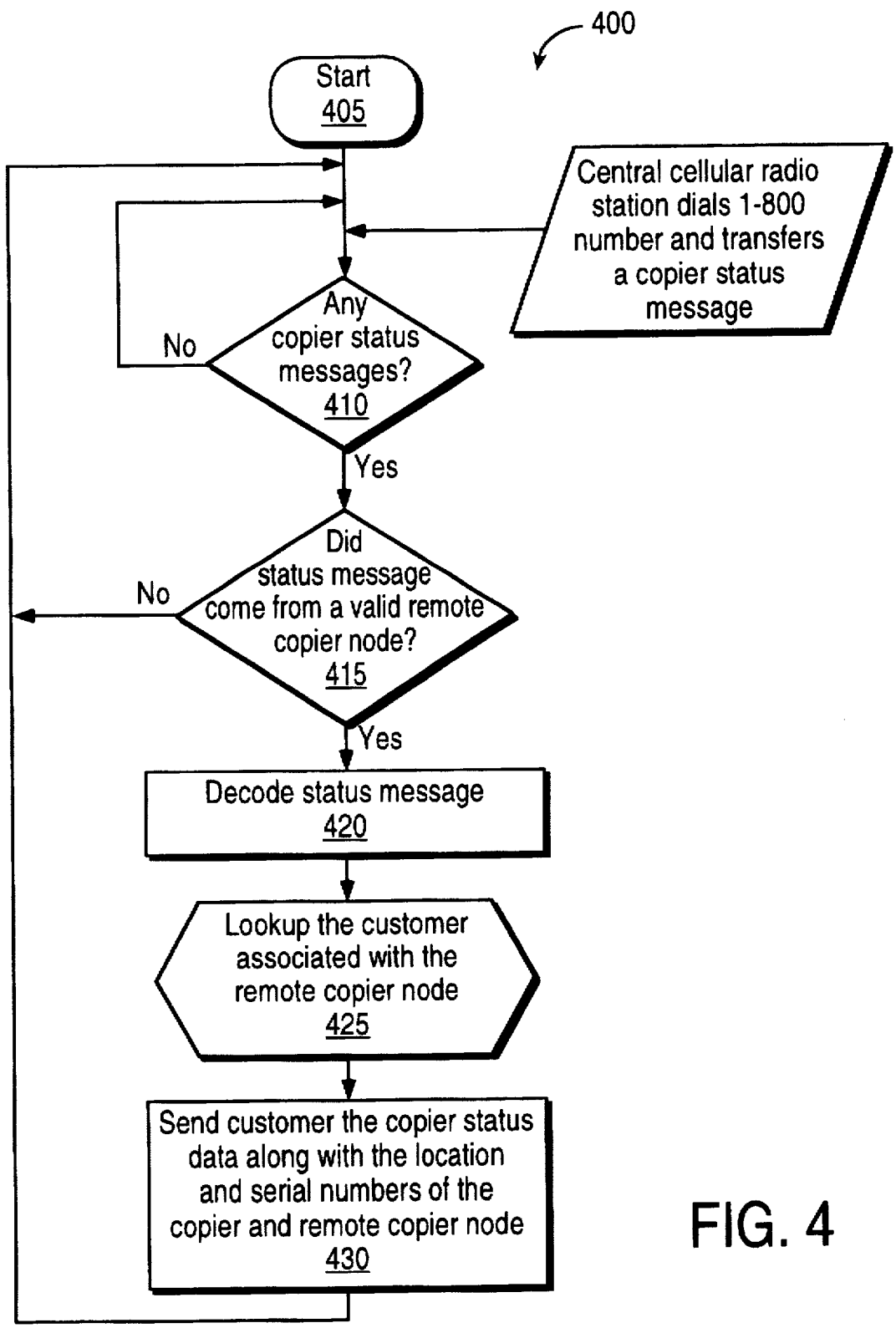
FIG. 4 presents one embodiment of the instructions for directing the operation of the processor of the central computer, during a status check operation

FIG. 4 presents another embodiment of the instructions for directing the operation of processor 210 during a status check operation. In one embodiment of the invention, the steps of this flowchart are implemented by a software code (i.e., a source code residing in RAM 220). However, one of ordinary skill in the art would understand that the steps of this flowchart can be implemented by a firmware code (i.e., a source code residing in ROM 225).

The initial step of the flowchart of FIG. 4 is the start step 405. At this step, the process starts at a pre-specified date and time. For example, in one embodiment of the invention, process 400 starts at the initialization of the remote copier node management apparatus, and thereafter remains active in order to continuously check incoming status data from the remote copier nodes.

From step 405, the process transitions to step 410, during which the central computer determines whether it has received a copier status message. In particular, process 400 remains at step 410 until a new copier status message arrives. The process then transitions to step 415, during which it verifies that the status message came from a valid remote copier node. For example, in one embodiment of the invention, process 400 performs this verification by examining whether the remote copier node has been flagged as an invalid node. The remote copier node might be designated as an invalid node when the subscriber, corresponding to that node, does not pay for the services rendered.

From step 415, the process transitions to decoding step 420 to decode the status message. In one embodiment of the invention, a table-look-up scheme is used for decoding the status message. Process 400 then transitions to step 425. At this step, the process identifies the subscriber that services the remote copier node. Finally, at step 430, the process sends the identified customer the copier status message, along with the location and identification number of the remote copier node. The process then transitions back to step 410 to wait for additional status messages.

Although the central computer's operating system has been described above with reference to specific embodiments set forth in FIGS. 3 and 4, one of ordinary skill in the art would understand that numerous modifications to these operating systems exist. For example, another embodiment of process 300 of FIG. 3 pages a remote copier node more than two times, before flagging it as an unresponsive node. In addition, another embodiment of process 300 of FIG. 3 does not page a group of remote copier nodes, but rather pages each remote copier node individually. Furthermore, in an alternative embodiment of the invention, process 400 of FIG. 4 (1) commands (via the central cellular radio station) a set of remote copier nodes to supply a specific status data, prior to its transition to step 410, and (2) halts its operation, after step 425, when all of the addressed remote copier nodes respond.

B. The Central Cellular Radio Station

Figure 5:
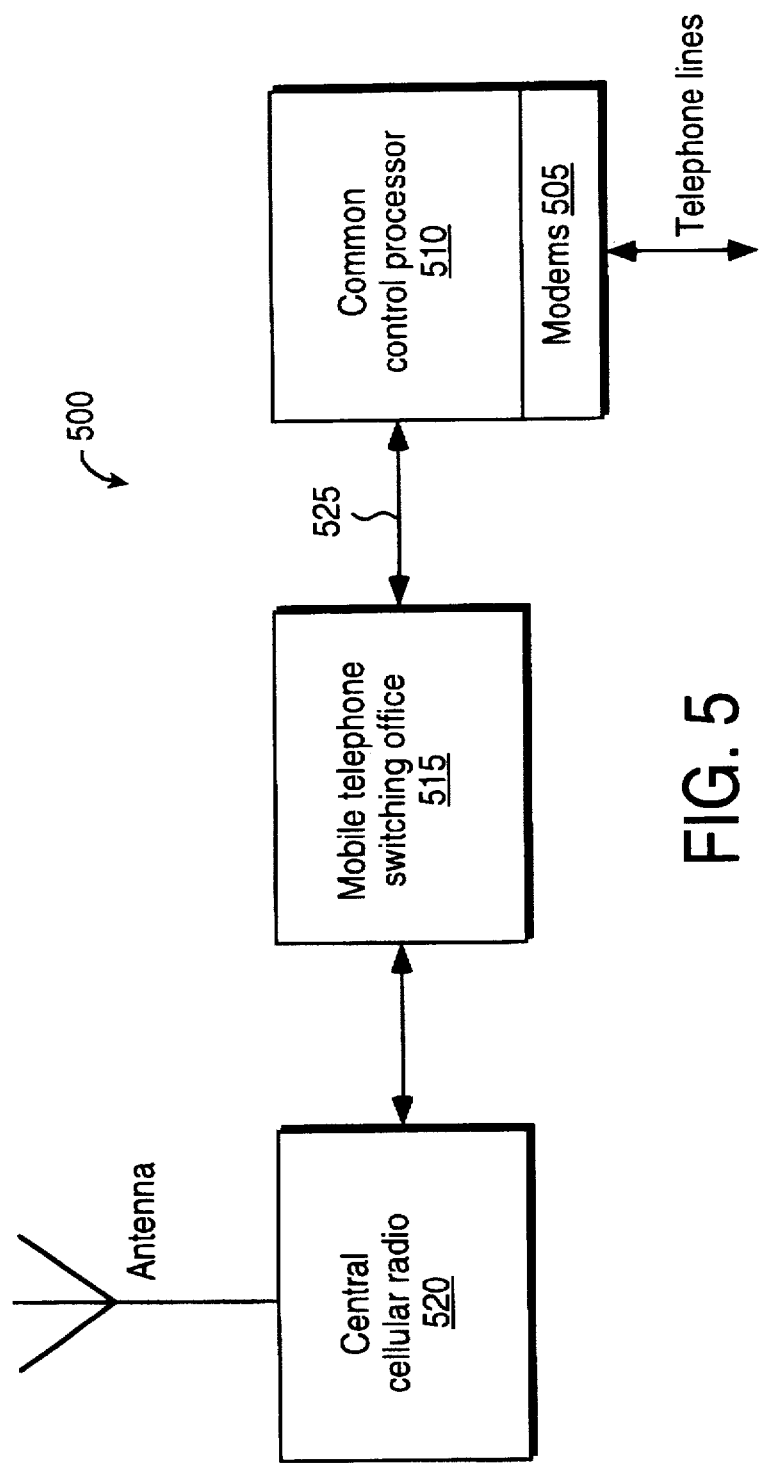
FIG. 5 presents one embodiment of a central cellular radio station that is used by the invention.

The central cellular radio station acts as a relay between the central computer and the remote copier nodes. FIG. 5 presents one embodiment of the central cellular radio station. As shown in this figure, central station 500 includes a pool of modems 505, a computer 510, a mobile telephone switching office 515, and a cellular radio 520. In one embodiment of the central station, modem pool 505 relays communications between the station's computer 510 and at least one central computer via a public switched telephone network (i.e., via telephone lines).

In turn, computer 510 communicates to mobile telephone switching office 515 via bidirectional, interconnecting link 525. For transmission signals it receives from computer 510, the switching office employs a particular switching technique (such as analog space-division switching techniques or digital time-division switching technique) to allocate the common carrier frequencies among the various signals. Switching office 515 then supplies these signals to the cellular radio 520 for transmission. In addition, switching device 515 isolates each signal that it receives from a remote copier node via radio 520, and supplies this isolated signal to computer 510.

Central cellular radio 520 broadcasts the commands it receives from switching office 515 to the addressed copier nodes (e.g., broadcasts identification numbers during a meter count collection operation). As mentioned above, central radio 520 also receives communications from the remote copier nodes and supplies these communications to the switching office. In addition, in one embodiment of the invention, central cellular radio 520 communicates to the remote copier node by using a cellular messaging technology called Cellemetry.

Cellemetry is a low-overhead cellular radio communication scheme that allows for transfer of real-time, remote data through a standard cellular telephone network. More specifically, under this scheme, the central station and the remote copier nodes communicate with each other by using the under-utilized frequency bands allocated to control channels of the cellular system. Control channels are utilized by the cellular telephone industry for transmitting control data between the switching facilities and cellular telephones. For example, cellular telephone networks utilize control channels to determine the "cell" (i.e., the geographic region) in which the cellular telephones operate. This determination provides the switching facilities with adequate response time to route the transmitted signals to the transmitting tower of the appropriate cell.

C. The Remote Copier Node

Figure 6:
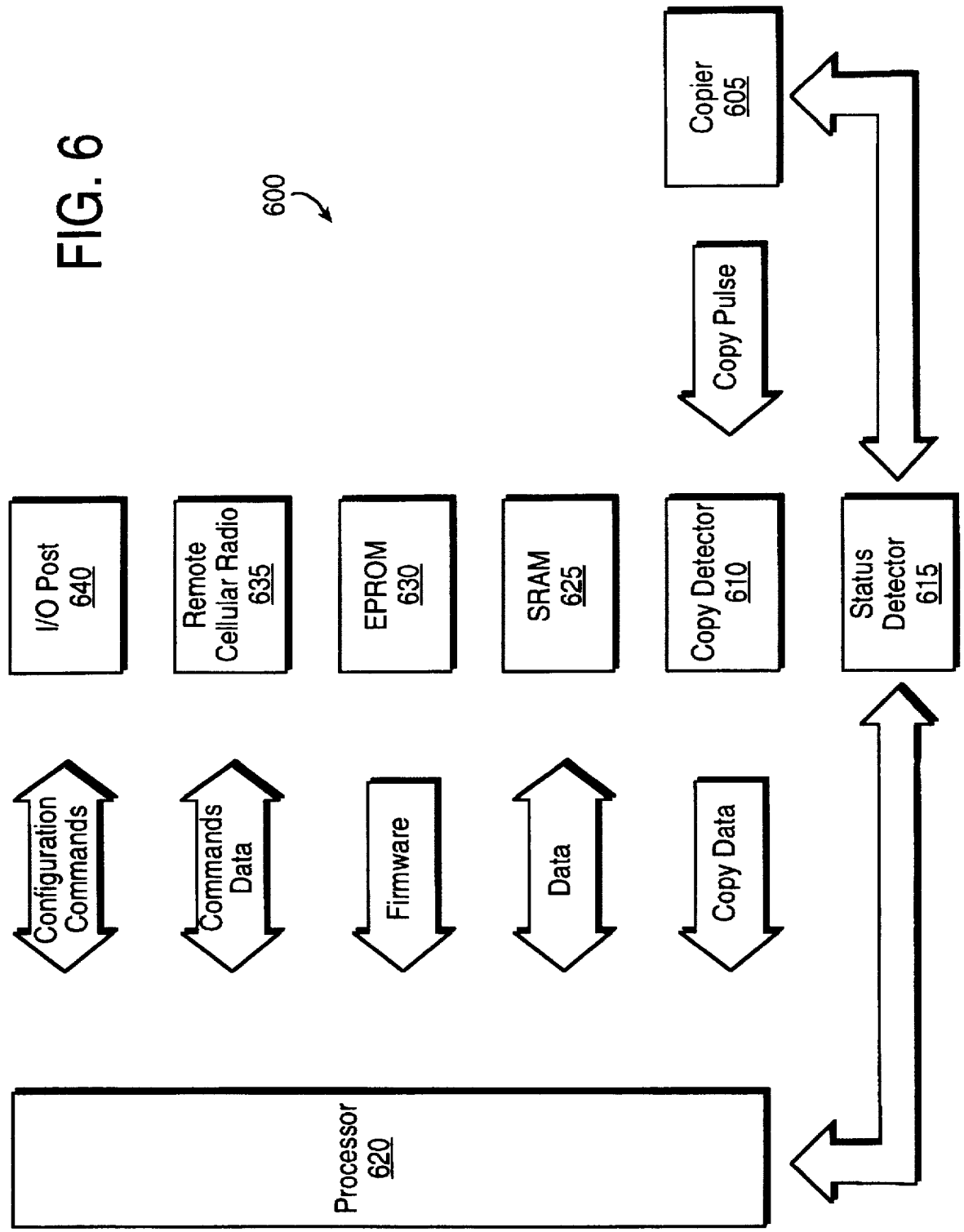
FIG. 6 presents one embodiment of the remote copier node of the apparatus of FIG. 1.

FIG. 6 presents a block diagram of one embodiment of a remote copier node. As shown in this figure, one embodiment of a remote copier node 600 includes a copier 605, a copy detector 610, a status detector 615, a processor 620, a static random access memory (SRAM) 625, an erasable programmable read only memory (EPROM) 630, a remote cellular radio 635, and an input/output (I/O) port 640.

Copy detector 610 connects to copier 605 and to processor 620. Specifically, every time copier 605 produces a copy, it generates a copy pulse, which it supplies to copy detector 610. In response to a copy pulse, detector 610 generates a copy data signal and supplies this signal to processor 620, in order to cause this processor to increment a copy count stored in static RAM 625.

One embodiment of the remote copier node also utilizes RAM 625 to store additional information pertaining to the copier (such as copier status data). Remote copier node 600 also includes EPROM 630, which stores the instructions that direct the processor's actions. Copier node 600 further includes status detector 615, which connects to both copier 605 and processor 620. This detector connects to the copier in order to obtain various status data from the copier. In addition, detector 615 connects to the processor so that (1) the processor can direct it to obtain a particular status information, and/or (2) it can supply status information to the processor.

As shown in FIG. 6, processor 620 further connects to remote cellular radio 635 to receive the copier management command transmitted from the central computer and the central cellular radio station. Moreover, in one embodiment of the invention, the instructions stored in EPROM 630 cause processor 620 to periodically examine a received command buffer of the remote cellular radio. In addition, when the copier management command is a request for data (e.g., meter collection data or status data), the processor supplies the requested data (e.g., the copy count or status data) from the data storage to the remote cellular radio. In turn, the remote cellular radio relays this data to the central computer via the central cellular radio. Finally, remote copier node 600 includes I/O port 640 for receiving configuration commands, that are manually entered by an operator. These commands are then used by the processor to configure the devices of the remote copier node.

1. Copy Detector

One embodiment of the copy detector is identical to the copy detecting circuitry used in the copier control terminal sold under the brand name of Alpha by Equitrac Corporation.

2. Status Detector

As shown in FIG. 6, the status detector of remote copier node 600 is a separate hardware device that detects the signal level of several copier status signals, that are generated internally in copier 605. One of ordinary skill in the art would realize that, in an alternative embodiment of the invention, the remote copier node's status detector is an input port through which an operator manually enters status data regarding the copier. Alternatively, in another embodiment of the invention, the status detector is a serial or parallel interface that (1) receives, from the copier, communications regarding the status of the copier, and (2) supplies status commands to the copier from the processor.

3. EPROM

Figure 7B:
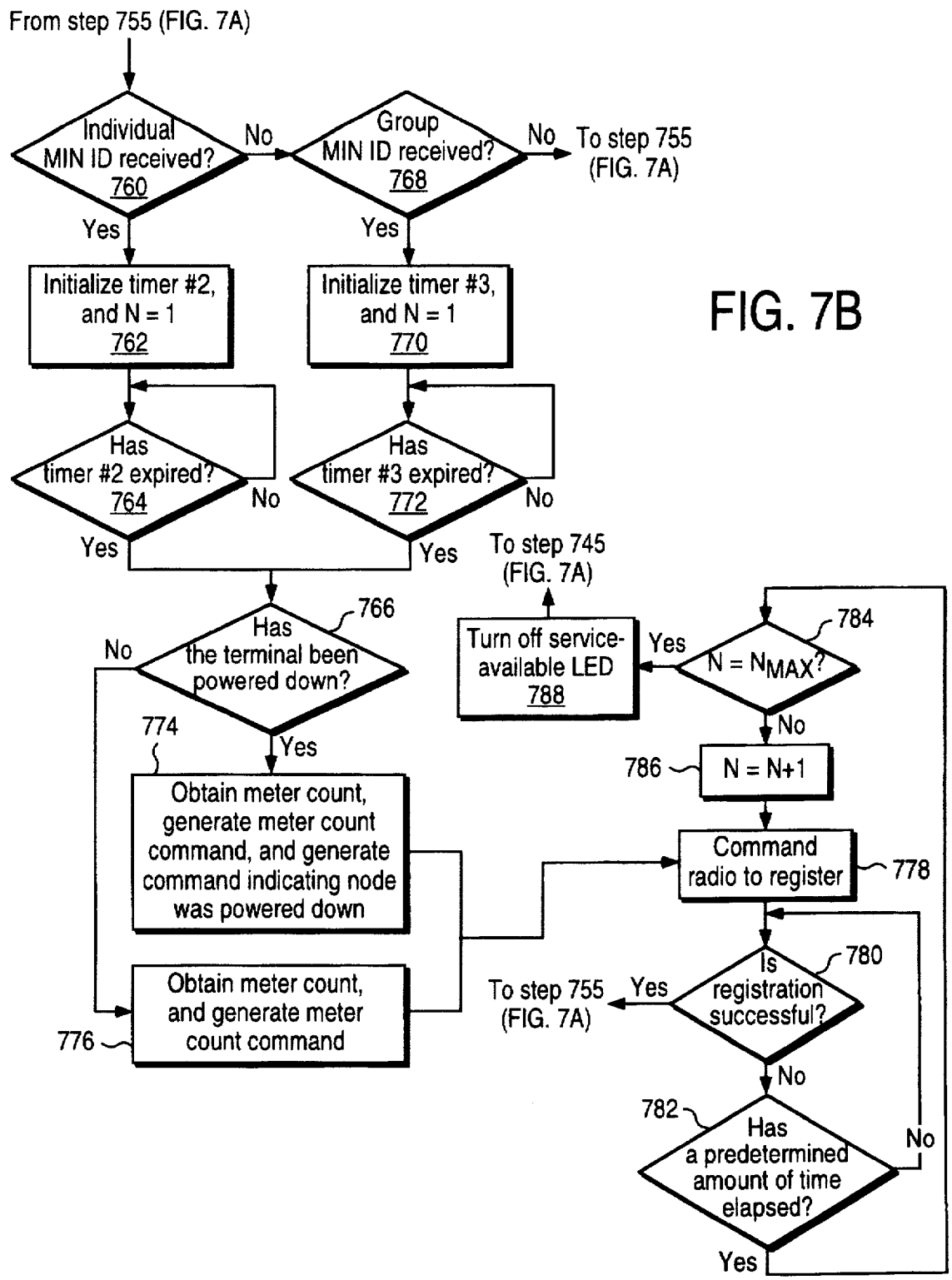
FIG. 7 presents one embodiment of the instructions for directing the operation of a processor at the remote copier node of FIG. 6.

FIG. 7 presents one embodiment of the EPROM's firmware instructions for directing the actions of processor 620, and thereby controlling the operation of remote copier node 600. One of ordinary skill in the art would recognize that, in an alternative embodiment of the invention, a software code residing in RAM 625 directs the operation of the remote node's processor, during communications with the central cellular radio station. Alternatively, the operational source code could reside in a standard ROM, as opposed to an erasable programmable ROM.

The first step of process 700 of FIG. 7 is power-up step 705. At this step, the devices of the remote copier node are turned on and initialized (e.g., the processor's Iram is tested). Next, at step 710, the process determines whether the initialization performed in step 705 was successful. If not, the process transitions to step 715 to halt the operation of the remote copier node and to indicate the failure to initialize the remote copier node.

However, if the initialization was successful (at step 705), the process transitions to step 720. At this step, the process determines whether the remote copier node has to be configured or reconfigured, by examining whether it has received a configuration signal at I/O port 640. Because of steps 725 and 730, process 700 waits at most for the configuration signal a first predetermined amount of time (measured by a first timer). If process 700 does not receive this signal within the specified time, then it deduces that the remote copier node has already been configured and does not need to be reconfigured. Consequently, the process transitions from step 730 to step 740.

On the other hand, if (at step 720) process 700 determines that the remote copier node has to be configured or reconfigured, the process transitions to step 735, where it enters a configuration mode. In this mode, the remote copier node receives, through its I/O port, programming data which it stores in the SRAM. The programming data includes (1) group and individual identification numbers (i.e., group and individual MINs) that the central computer uses to identify the remote copier node, (2) service provider data that the remote copier node uses to select the cellular service provider used by the remote cellular radio, and (3) service provider identification number that the remote cellular radio uses to access a central radio station of the selected service provider. After the configuration step 735, the process then transitions to step 740.

Moreover, after the configuration data is entered at step 735, an operator at the remote copier node calls the central computer to inform it of the location and the identification numbers (i.e., the MINs) of remote copier node 600. In turn, the central computer uses the remote copier node location data to identify the central radio station that it should use to access the remote copier node. In addition, during meter count collection operations, the central computer uses the remote copier nodes identification numbers to address the remote copier node. Furthermore, upon receiving the location and identification data, the central computer designates the remote copier node as an active node.

At step 740, the process initializes the remote cellular radio for receiving and transmitting messages. Specifically, in one embodiment of the invention, process 700 (1) obtains the programmed MINs, service provider data, and service provider identification data from SRAM 625 of the remote copier node, and (2) stores the data in a RAM of the remote cellular radio. In an alternative embodiment of the invention, the remote cellular radio is programmed prior to its installation.

From step 740, the process transitions to step 745, during which it determines if cellular service is available. In one embodiment of the invention, after initialization step 740, remote cellular radio 635 starts searching for the carrier frequency used for broadcasting by the central cellular radio station or stations of the selected service provider. Once the remote cellular radio detects this carrier frequency, it stores a service available signal in its RAM. In turn, at step 745, processor 620 repeatedly polls remote radio 635 for the service available signal. In another embodiment of the invention, the remote cellular radio supplies this service available signal to processor 620, once the radio detects the carrier frequency of the selected provider.

The process remains at step 745 until it determines that cellular service is available. Once the process determines that cellular service is available, it transitions to step 750 to light up a service-available LED for indicating the availability of service. From step 750, the process transitions to step 755, where the process remains until the remote cellular radio receives a valid message.

In one embodiment of the invention, the remote cellular radio concludes that it has received a valid message by using a table-look-up technique to determine if a received message is one of the MIN numbers that processor 620 downloaded to it. Moreover, in one embodiment of the invention, step 755 causes processor 620 (1) to periodically check (e.g., check every second) the remote radio's data storage location for storing recently arrived, valid MIN messages, and (2) to retrieve and store a recently arrived, valid MIN message.

Once the remote cellular radio receives a valid message, process 700 transitions to step 760. At this step, the process determines whether the arrived message is an individual MIN assigned to the remote cellular radio. If so, the process (1) initially transitions to step 762, where a second timer is initialized and a registration count N is set to one, (2) then transitions to step 764, where it remains until the second timer expires, and (3) eventually transitions to step 766.

On the other hand, if the process (at step 760) determines that the received message is not an individual MIN, the process transitions to step 768, where the processor determines if the arrived message is a group MIN assigned to the remote cellular radio. In one embodiment of the invention, processor 620 determines (at step 760 or step 768) whether the MIN message it retrieved (at step 755) is an individual or group MIN assigned to the remote cellular radio. However, in another embodiment of the invention, remote cellular radio 635 initially determines whether the arrived message corresponds to its individual or group MIN, and then relays the results of this determination to processor 620.

In any event, if (at step 768) the process determines that the received message is also not a valid group MIN (e.g., if the radio incorrectly identified the received message as a valid MIN message), the process transitions back to step 755. However, if the received message is a group MIN, the process (1) initially transitions to step 770, where a third timer is initialized and the registration count N is set to one, (2) then transitions to step 772, where it remains until the third timer expires, and (3) eventually transitions to step 766. Typically, the third timers of the remote copier nodes expire at different time intervals, in order to prevent responses to group messages from colliding.

At step 766, the process determines whether the remote copier node has recently been turned off. In one embodiment of the invention, process 700 makes this determination by examining the value of a power-down Boolean variable, which is set to true whenever the remote copier node experiences a power loss after configuration step 735. Specifically, this power-down variable is set to true whenever the remote copier node is powered up (i.e., whenever process 700 starts at step 705). On the other hand, whenever the remote copier node is configured or reconfigured (i.e., whenever process 700 transitions to step 735), this variable is set to false.

Moreover, process 700 determines (at step 766) whether the remote copier node has been recently turned off, in order to inform the central computer, and thereby inform the subscribing vendor, that the meter count data collected from the remote copier node might be inaccurate due to a power loss. If, at step 766, the process determines that the remote copier node has recently been powered down, the process transitions to step 774 to (1) obtain the meter count data from SRAM 625, (2) generate a meter count command, which identifies the accompanying data as meter count data, and (3) generate a power-down command, which informs the central cellular radio station (and thereby informs the central computer) of the power loss at the remote copier node. In addition, at step 774, the process stores the generated commands and data in the RAM of the remote cellular radio.

On the other hand, if (at step 766) the process concludes that the node has not been powered down, the process transitions to step 776 to obtain the meter count data and to generate the meter count command. At step 776, the process also stores the generated command and data in the RAM of the remote cellular radio. From either step 774 or step 776, the process then transitions to step 778, where it directs the processor to command the remote cellular radio to register the meter count data and the command, or commands, with the central radio station (i.e., to transmit the data and command/commands to the central radio station in one or more data packets, which also include identification data identifying the transmitting remote cellular node).

Next, the process transitions to step 780, during which it determines whether the registration was successful. In one embodiment of the invention, the process concludes that the registration was successful when the remote cellular radio receives an acknowledge signal from the central cellular radio station (i.e., the remote radio receives a signal confirming that the central cellular radio station received the transmitted data packet/packets). Moreover, in one embodiment of the invention, processor 620 (at step 780) periodically polls the remote radio in search of this acknowledge signal.

In addition, because of step 782, process 700 waits a predetermined amount of time to determine whether the registration was successful. If the registration was successful, the process transitions back to step 755. However, if the registration was not successful, the process transitions to step 784 to determine if the registration count has reached a maximum value $N_{max}$. The registration count variable represents the number of times that the remote radio has tried to register the meter count with the central cellular radio.

If, at step 784, the process determines that the registration count has not reached its maximum value, the process (1) initially transitions to step 786 to increment the registration count by one, and (2) then transitions back to step 778 to again command the remote cellular radio to transmit the stored data and command/commands. However, if the remote cellular radio has attempted to register the meter count a maximum number of times, the process (1) ceases its attempts to transmit meter count data to the central cellular radio, (2) transitions from step 784 to step 788 to turn off the service available LED, and (3) transitions to step 745 to determine if cellular services are still available.

In alternative embodiments of the invention, process 700 of FIG. 7 directs processor 620 to not only respond to meter count collection requests, but also respond to alternative management requests from the central computer. For example, in response to a request for status data, process 700 (at step 774 or 776) obtains status data from SRAM 625 and generates a status data command (identifying the accompanying data as status data), instead of obtaining meter count data and generating meter count command.

Figures 8, 8A:
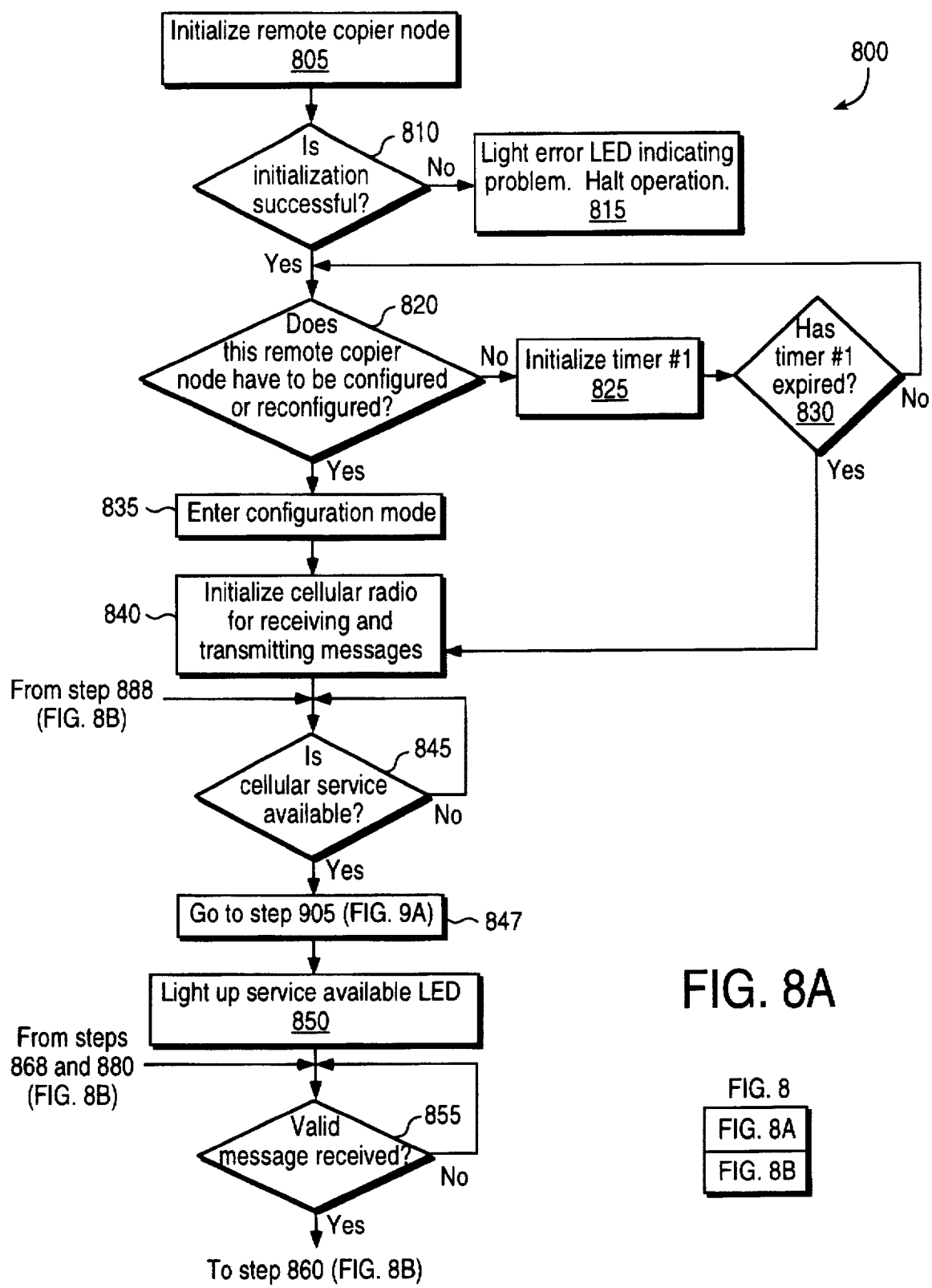
FIG. 8 presents one embodiment of the instructions for directing the operation of the processor at the remote copier node of FIG. 6.
Figure 8B:
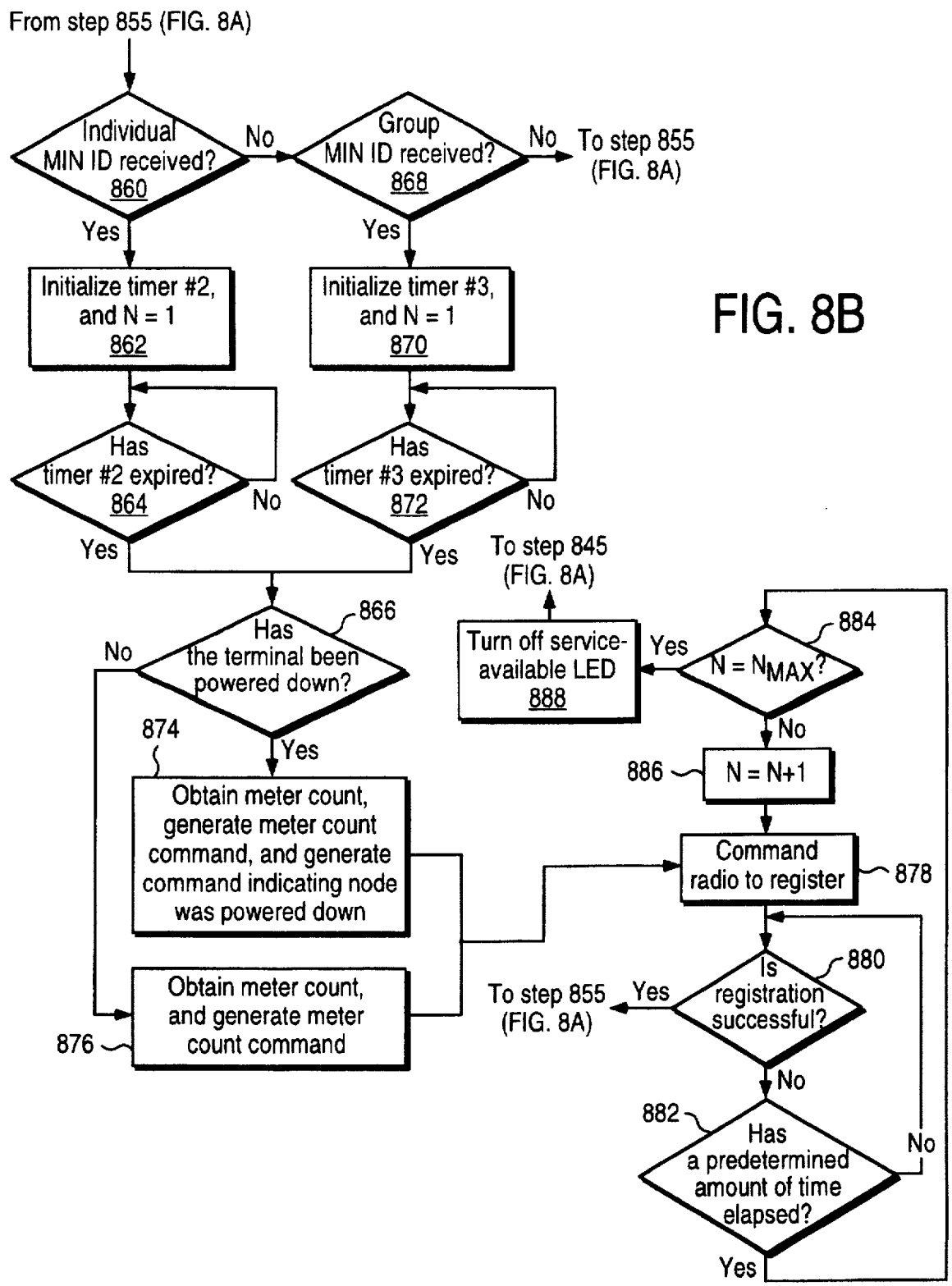

FIG. 8 presents another embodiment of the EPROM's firmware instructions for directing the actions of processor 620, and thereby controlling the operation of remote copier node 600. Process 800 can be used in embodiments of the invention that have a real-time connection between the central cellular radio station and the central computer. As further discussed below, process 800 utilizes this real-time connection to obviate the need for an operator to call the central computer (after the configuration step 835), in order to activate the remote copier node by informing the central computer of the location and the identification numbers (i.e., the MINs) of remote copier node 600. In other words, unlike process 700, process 800 has a step (i.e., step 847) for automatically causing the central computer to designate the remote copier node as an active node.

More specifically, process 800 is identical to process 700, except that it has an extra step 847, and that its steps 835, 840, and 845 are slightly different than corresponding steps 735, 740, and 745 of FIG. 7. Consequently, the description with respect to steps 705–730 and 750–786 also describes the operation of steps 805–830 and 850–886. Thus, in order not to obscure the description of the invention with unnecessary detail, the following description of process 800 only pertains to steps 835–847.

Like process 700 which includes configuration step 735, process 800 includes a configuration step 835, during which the remote copier node receives (through its I/O port) programming data. In addition, like the programming data entered during step 735, the programming data entered during step 835 includes: (1) group and individual identification numbers, (2) cellular service provider data, and (3) service provider identification numbers.

However, unlike the service provider data of step 735, the service provider data of step 835 does not identify a selected service provider for the remote cellular radio. Rather, the service provider data of step 835 identifies a number of potential service providers. As further discussed below, this is because process 800 includes step 847, which utilizes the real-time connection between the central radio station of a particular service provider and the central computer to identify the particular service provider (i.e., the service provider used by the central computer).

From step 835, process 800 transitions to step 840 to initialize the remote cellular radio for receiving and transmitting messages. In one embodiment of the invention, at step 840, process 800 causes processor 620 to (1) obtain the data programmed during step 835 from SRAM 625, and (2) command the remote cellular radio to store this data in its RAM.

Next, process 800 transitions to step 845, during which it determines if a cellular service is available. In one embodiment of the invention, the remote cellular radio makes this determination by detecting cellular radio broadcasts at the carrier frequency of one of the programmed service providers. Moreover, in one embodiment of the invention, each service provider's carrier frequency is identified by the service provider data, that processor 620 downloads to remote cellular radio 635. The process remains at step 845 until it determines that a cellular services is available.

Figure 9A:
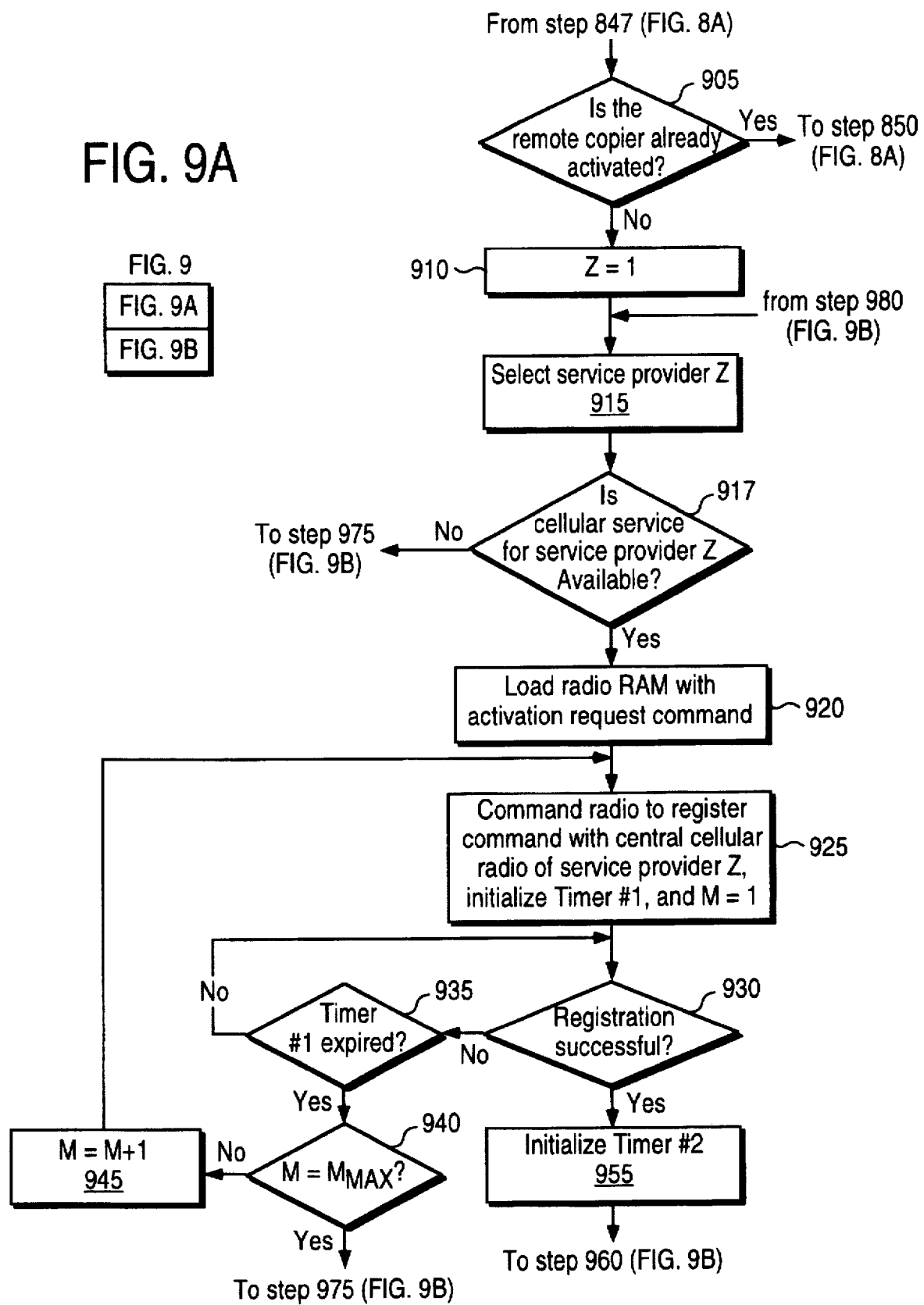
FIG. 9 presents one example of the steps performed to activate the remote copier node.
Figure 9B:
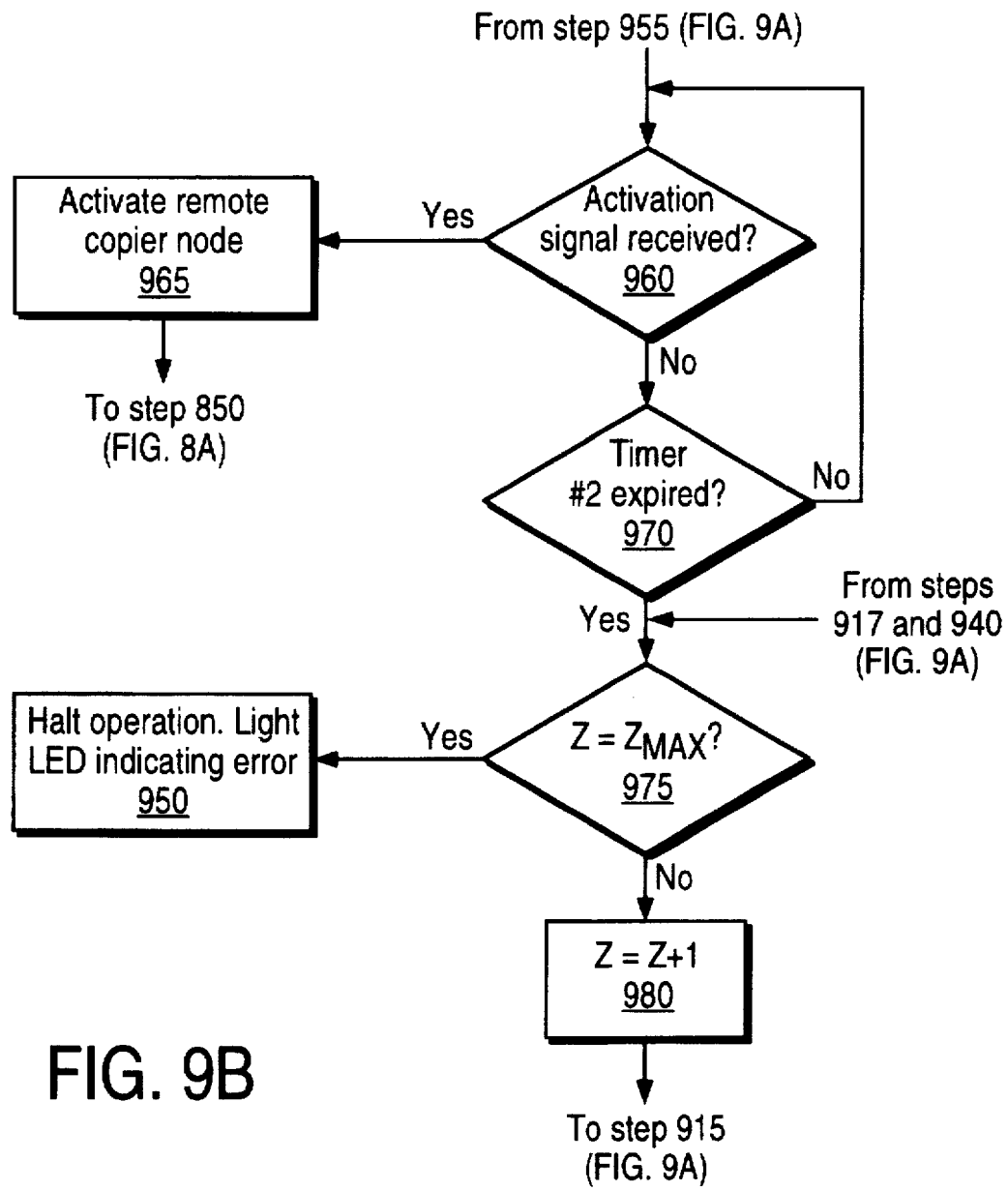

Once the process determines that a cellular service is available, it transitions to step 847 to identify the appropriate service provider by utilizing the real-time connection between the central radio station of the appropriate service provider and the central computer. Specifically, step 847 directs the process to step 905 of FIG. 9, which, for one embodiment of the invention, sets forth one example of the steps performed to identify the service provider used by the central computer.

At step 905, the process determine whether the remote copier node has already been activated (i.e., whether the central computer has designated the remote copier node as an active node). In one embodiment of the invention, process 900 makes this determination by examining the value of a NODE_ACTIVE Boolean variable, which is preset to false at step 835. If, at step 905, the process determines that the remote copier node has achieved an active status, then it transitions to step 850. However, if the remote copier node has not achieved an active status, process 900 transitions to step 910 to set the value of a service-provider variable Z to one. This service-provider variable Z identifies a particular service provider from the programmed list of service providers.

From step 910, the process transitions to step 915, during which it directs the remote cellular radio to use service provider Z. Next, at step 917, the process determines if cellular service from service provider Z is available. In one embodiment of the invention, the remote cellular radio makes this determination by detecting the carrier frequency, which the central cellular radio stations of service provider Z use for broadcasting. If, at step 917, the process determines that cellular service is not available for service provider Z, then it transitions to step 975 to determine if it has tried all of the service providers. However, if it determines that cellular service is available for service provider Z, the process transitions to step 920.

At step 920, the process causes processor 620 to load an activation request command in the RAM of the remote copier node. At step 925, process 900 then (1) commands the radio to register the request with the central cellular radio, (2) initializes a first timer, and (3) sets the value of a registration count M to 1. In one embodiment of the invention, process 900 (at step 925) also commands the radio to transmit its identification numbers, along with the activation request, to the central computer via the central cellular radio. These identification numbers would then enable the central computer to address the remote copier node. In addition, the transmission of the identification numbers, during real-time operations, obviates the need for these numbers to be relayed manually to the central computer after the configuration of the remote copier node.

The process transitions from step 925 to step 930. At this step, the process determines whether the registration was successful. If not, the process transitions to step 935 to determine whether the first timer has expired. If the timer has not expired, the process transitions back to step 930. However, if the timer has expired, the process transitions to step 940 to determine whether it has attempted the registration a maximum number of times $M_{max}$. If so, the process transitions to step 975 to determine if it has tried all of the service providers. On the other hand, the process transitions to step 945 when it determines that it has not attempted to register the activation command for a maximum number of times. At step 945, the process increments the registration count by one, and then transitions back to step 925.

As mentioned above, at step 930, process 900 determines whether the registration was successful (e.g., whether the remote copier node has received an acknowledge signal from the addressed central cellular radio). In addition, after the activation request is successfully registered in the addressed central cellular radio of service provider Z, then the central radio station of the addressed central radio determines if the central computer utilizes its service provider to communicate with the remote copier nodes.

In the event that the central computer utilizes service provider Z, the addressed central cellular radio station for service provider Z relays the activation command request to the computer via a real-time interconnect. The central computer, in turn, designates the central radio station, that relayed the activation request, as the appropriate central station that it has to access to communicate with the remote copier node. The central computer also designates the remote copier node as an active node, and transmits an activation signal to the remote copier node via the central radio station. In addition, the remote radio transmits its identification numbers at step 925, in order to provide the central computer with these identification numbers, which it uses to address the remote copier node.

If, at step 930, process 900 concludes that the registration was successful, then it transitions to step 955 to initialize a second timer. Next, the process transitions to step 960, during which it determines whether the remote copier node (i.e., the remote cellular radio) has received an activation signal from the central computer via the addressed central radio station. If, at step 960, process 900 determines that it has received an activation command from the central computer, then it transitions to step 965 to activate the remote copier node. In one embodiment of the invention, the activation command transmitted by the central computer is an identification number stored by the remote copier node as an activation command. Furthermore, in one embodiment of the invention, the process activates the node by changing the value of the NODE_ACTIVE Boolean variable to true. From step 965, the process transitions to step 850 of FIG. 8.

However, if (at step 960) the process determines that it has not received an activation command, the process transitions to step 970 to determine whether the second timer has expired. If the timer has not expired, the process transitions back to step 960. On the other hand, if the second timer has expired, the process transitions to step 975 to determine whether it has used all of the service providers, in order to reach the central computer. If so, the process transitions to step 950 to halt its operation and indicate occurrence of an error. However, if (at step 975) the process determines that it has not utilize all of the service providers to reach the central computer, it transitions to step 980 to increment the service provider variable by one. From step 980, the process then transitions back to step 915 to establish communications with the central computer via another service provider.

4. Remote cellular radio

One embodiment of remote cellular radio 635 is similar to a cellular telephone whose user interface (i.e., keypad, display, and audio interface) and voice processing circuitry have been removed. A more specific embodiment of this remote cellular radio is an AMPS cellular radio, with the above-mentioned features removed. In addition, in one embodiment of the invention, the remote AMPS cellular radio communicates to the central radio station by using the Cellemetry cellular messaging technology.

Figure 10:
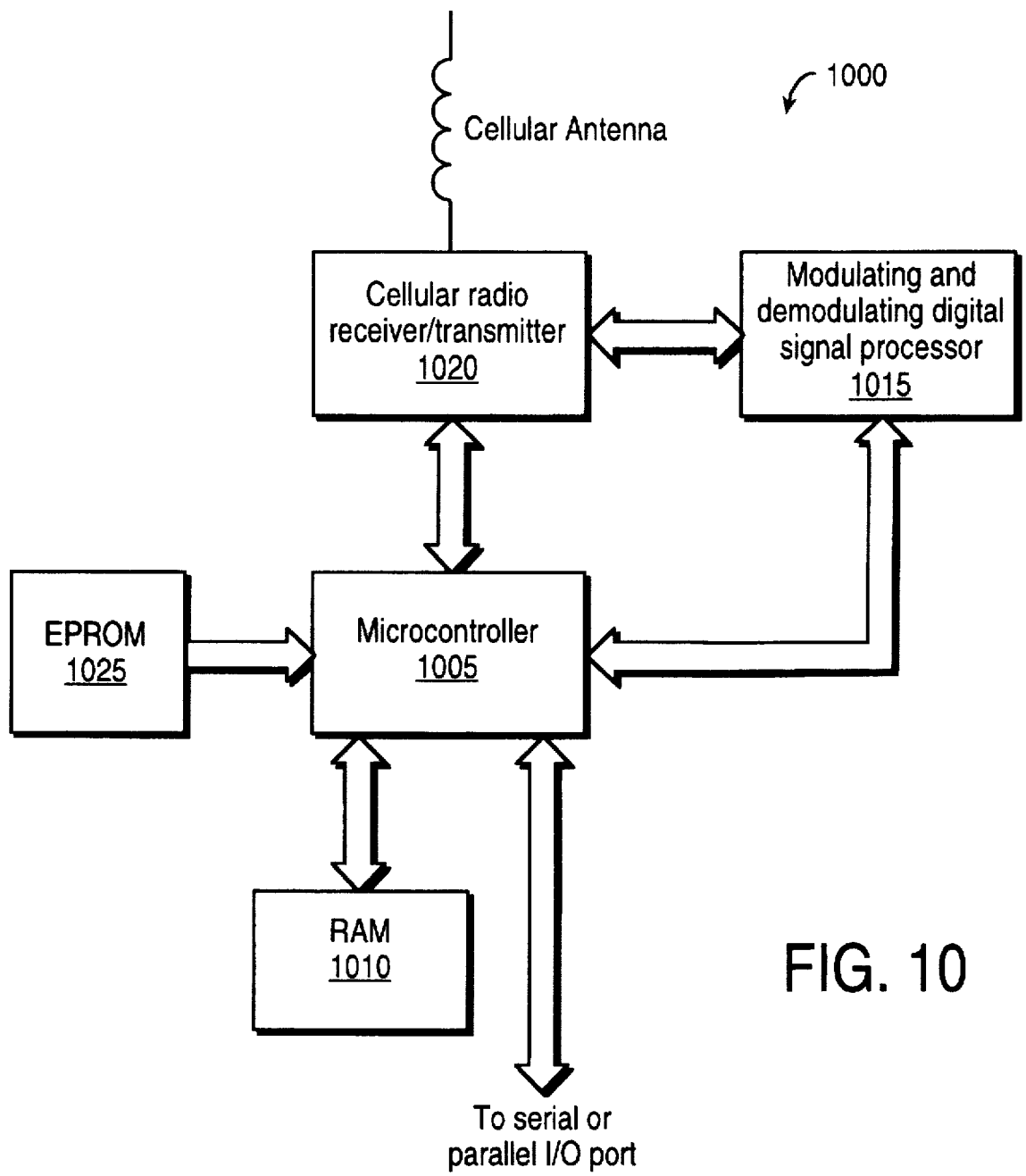
FIG. 10 present one embodiment of a remote cellar radio that is used by the invention.

FIG. 10 presents a more detailed embodiment of the remote cellular radio of FIG. 6. As shown in FIG. 10, remote cellular radio 1000 includes a microcontroller 1005, a RAM 1010, a digital signal processor (DSP) 1015, a cellular radio transceiver 1020, and EPROM 1025. Radio 1000 utilizes RAM 1010 to store incoming messages (such as incoming MIN messages), outgoing messages (such as meter count data), and programming data (such as MIN data, service provider data, and service provider identification data).

Moreover, the software residing in RAM 1010, as well as the instructions that are received through a serial or parallel input/output port (which connects the radio to processor 620), direct microcontroller 1015 to perform certain operations. The firmware residing in EPROM 1025 also directs the operation of microcontroller 1025. Furthermore, radio 1000 utilizes DSP 1015 to modulate outgoing messages that it receives from its cellular radio transceiver 1020. DSP 1015 also demodulates incoming message that transceiver 1020 supplies to it.

Finally, for the embodiment of the invention that utilizes Cellemetry, one embodiment of the remote cellular radio 635 is identical to remote cellular radio 1000, except that this radio's firmware is customized for operating with Cellemetry technology. For instance, a Cellemetry radio's firmware is customized so as to allow the radio to receive initialization data (such as MINs, service provider data, service provider identification number, etc.) through an I/O port, rather than a keypad. Moreover, the Cellemetry firmware would not include instructions pertaining to the radio power level during voice channel operations.

Also, the Cellemetry firmware would include instructions for enabling the radio to receive meter count data from its I/O port and to store this data in the cellular radio's ESN register. Processor 620 can then command the radio to transmit the meter count data (along with the meter count command and the remote node's individual MIN) to the central cellular radio station, by simply providing a standard register command to the radio.

Typical cellular telephones periodically broadcast their ESNs (electronic serial numbers stored in their ESN register) and individual MINs, whenever they receive a register command. As described above, however, one embodiment of the Cellemetry radio used by invention stores meter count data in its ESN register so that it can transmit this data in response to a register command. Finally, another example of a cellular radio capable of operating with Cellemetry is the cellular radio sold under the brand name of Cellemetry Modem Module by Standard Communications.

As apparent from the discussion above, the present invention is advantageous because it enables a central computer to collect copy count data from a number of remotely located copiers. In addition, the invention's method and apparatus for managing remotely located copiers from a central computer improves the quality of services provided by subscribing vendors, because it also enables the central computer to check on the status of the remote copiers (e.g., to retrieve status data from the copier nodes).

While the invention has been described with reference to numerous specific details, one of ordinary skill in the art would recognize that the invention can be embodied in other specific forms without departing from the spirit of the invention. For example, although the description above relates to a method and apparatus for managing remotely located copiers, one of ordinary skill in the art would realize that managing remotely located copiers, one of ordinary skill in the art would realize that the invention can also be used to manage other remotely located document-producing machines (such as printers, facsimile machines, stamp generating machines, etc.). Thus, one of ordinary skill in the art would understand that the invention is not to be limited by the foregoing illustrative details, but rather is to be defined by the appended claims.

We claim:

1. An apparatus for managing remotely located document-producing machines by using a cellular radio network, said apparatus comprising:

(a) a plurality of remote document-producing nodes;

(b) a central computer generating a node management command directed towards a selected one of said remote nodes; and (c) a central cellular radio station receiving said management command, said station having a central cellular radio transmitting communications to said remote nodes, said station transmitting via said central cellular radio said management command to said selected remote node.

2. The apparatus of claim 1, wherein said selected remote node includes a remote cellular radio receiving said transmitted management command.

3. The apparatus of claim 2, wherein said central cellular radio station also receives communications from said remote nodes, wherein said remote cellular radio transmits response of said remote node to said management command, when said command is a request for information.

4. The apparatus of claim 2, wherein said central cellular radio transmits said management command to said remote cellular radio on a frequency band allocated to a control channel of the cellular radio network.

5. The apparatus of claim 1, wherein said selected remote node includes:

(a) a document-producing machine;

(b) a document-counting circuit coupled to said document-producing machine, said document-counting circuit maintaining a count of document output units produced by said document-producing machine;

(c) a remote cellular radio coupled to said counting circuit, said remote cellular radio receiving said management command and supplying said command to said counting circuit;

(d) wherein, when said management command is a request for said document output count, said counting circuit supplies said document output count to said remote cellular radio to transmit to said central computer via said central cellular radio.

6. The apparatus of claim 5, wherein said counting circuit comprises:

(a) a detector receiving count pulses from said document-producing machine whenever it produces a unit of document output;

(b) a data storage medium storing said document output count; and (c) a processor coupled to said detector, said data storage medium, and said remote cellular radio, said detector commanding said processor to increment said document output count whenever said detector receives said count pulses;

(d) wherein, when said management command is a request for said document output count, said processor obtains said count from said data storage and transmits said count to said central computer via said remote and central cellular radios.

7. The apparatus of claim 1, wherein said management command is directed towards a number of said remote nodes.

8. An apparatus for managing remotely located document-producing machines, said apparatus comprising:

(a) a plurality of remote document-producing nodes;

(b) a central computer; and (c) a central cellular radio station communicatively coupled to said central computer, said station having a central cellular radio for receiving communications from said remote nodes, said station receiving via said central cellular radio a communication from one of said remote document-producing nodes and relaying this communication to said central computer.

9. An apparatus for managing remotely located copiers by using a cellular radio network, said apparatus comprising:

(a) a plurality of remote copier nodes;

(b) a central computer generating a copier management command directed towards a selected one of said remote copier nodes;

(c) a central cellular radio station receiving said copier management command, said station having a central cellular radio transmitting communications to said remote copier nodes, said station transmitting via said central cellular radio said copier management command to said selected remote copier node.

10. The apparatus of claim 9, wherein said selected remote copier node includes a remote cellular radio receiving said transmitted copier management command.

11. The apparatus of claim 10, wherein said central cellular radio transmits said copier management command to said remote cellular radio on a frequency band allocated to a control channel of the cellular radio network.

12. The apparatus of claim 10, wherein said copier management command is an identification number identifying said selected remote copier node and identifying a particular operation that said selected remote copier node has to perform.

13. The apparatus of claim 12, wherein said identification number corresponds to a particular identification number stored in said selected remote cellular radio.

14. The apparatus of claim 10, wherein said copier management command includes:

(a) an identification number identifying said selected remote copier node, and (b) an operation command identifying a particular operation that said selected remote copier node has to perform.

15. The apparatus of claim 14, wherein said copier management command is transmitted to said remote copier nodes in one data packet.

16. The apparatus of claim 14, wherein said copier management command is transmitted to said remote copier nodes in more than one data packet.

17. The apparatus of claim 10, wherein said central cellular radio station also receives communications from said remote copier nodes, wherein said remote cellular radio transmits response of said remote copier node to said copier management command, when said command is a request for information.

18. The apparatus of claim 17, wherein, after receiving said selected copier node's response to said copier management command, said computer system generates a report.

19. The apparatus of claim 18, wherein, after receiving said selected copier node's response to said copier management command, said computer system also forwards said report to a vendor of a copier at said remote copier node.

20. The apparatus of claim 9, wherein said selected remote copier node includes:

(a) a copier;

(b) a copy counting circuit coupled to said copier, said copy counting circuit maintaining a copy count of number of copies produced by said copier;

(c) a remote cellular radio coupled to said copy counting circuit, said remote cellular radio receiving said copier management command and supplying said command to said copy counting circuit;

(d) wherein, when said copier management command is a request for said copy count, said copy counting circuit supplies said copy count to said remote cellular radio to transmit to said central computer via said central cellular radio.

21. The apparatus of claim 20, wherein said copy counting circuit comprises:

(a) a copy detector receiving copy count pulses from said copier whenever it produces a copy;

(b) a data storage medium storing said copy count; and (c) a processor coupled to said copy detector, said data storage medium, and said remote cellular radio, said copy detector commanding said processor to increment said copy count whenever said copy detector receives said copy count pulses;

(d) wherein, when said copier management command is a request for said copy count, said processor obtains said copy count from said data storage and transmits said copy count to said central computer via said remote and central cellular radios.

22. The apparatus of claim 21, wherein said remote copier node further comprises an instruction storage storing instructions that direct operation of said processor.

23. The apparatus of claim 21, wherein said remote cellular radio has a received command storage, said processor periodically accessing said command storage to determine if said computer system has transmitted a new copier management command.

24. The apparatus of claim 9, wherein said computer system communicates to said central cellular radio station via telephone lines.

25. The apparatus of claim 9, wherein said copier management command is directed towards a number of said remote copier nodes.

26. An apparatus for managing remotely located copiers, said apparatus comprising:

(a) a plurality of remote copier nodes;

(b) a central computer;

(c) a central cellular radio station communicatively coupled to said central computer, said station having a central cellular radio for receiving communications from said remote copier nodes, said station receiving via said central cellular radio a communication from one of said remote copier nodes and relaying this communication to said central computer.

27. An apparatus for managing remotely located copiers, said apparatus comprising:
   (a) a plurality of remote copier nodes;
   (b) a central computer for generating a copier management command directed towards a selected one of said remote copier nodes;
   (c) a central cellular radio station for receiving said copier management command, said station having a central cellular radio for transmitting and receiving communications to said remote copier nodes, said station for transmitting via said central cellular radio said copier management command to said selected remote copier node.

28. The apparatus of claim 27, wherein said selected remote copier node includes a remote cellular radio for receiving said transmitted copier management command.

29. The apparatus of claim 28, wherein said remote cellular radio is also for transmitting responses of said remote copier node to said copier management command, when said command is a request for information.

30. The apparatus of claim 28, wherein said central and remote cellular radios are AMPS radios.

31. The apparatus of claim 30, wherein said central and remote cellular radios communicate with each other on a frequency band allocated to a control channel of the AMPS cellular system.

32. The apparatus of claim 27, wherein said selected remote copier node includes:
   (a) a copier for producing copies;
   (b) a copy counting circuit, coupled to said copier, for maintaining a copy count of number of copies produced by said copier;
   (c) a remote cellular radio, coupled to said copy counting circuit, for receiving said copier management command and supplying said command to said copy counting circuit;
   (d) wherein, when said copier management command is a request for said copy count, said copy counting circuit supplies said copy count to said remote cellular radio to transmit to said central computer via said central cellular radio.

33. The apparatus of claim 32, wherein said copy counting circuit comprises:
   (a) a copy detector for receiving copy count pulses from said copier whenever it produces a copy;
   (b) a data storage medium for storing said copy count; and
   (c) a processor coupled to said copy detector, said data storage medium, and said remote cellular radio, said processor for incrementing said copy count in response to commands that said copy detector generates upon receiving said copy count pulses;
   (d) wherein, when said copier management command is a request for said copy count, said processor obtains said copy count from said data storage and transmits said copy count to said central computer via said remote and central cellular radios.

34. The apparatus of claim 33, wherein said remote copier node further comprises an instruction storage for storing instructions that direct operation of said processor.

35. The apparatus of claim 34, wherein said remote cellular radio has a received command storage for storing recently arrived communications from said central radio station, said processor for periodically accessing said command storage to determine if said computer system has transmitted a new copier management command.

36. The apparatus of claim 27, wherein one of said plurality of remote copier node initiates a remote management operation by transmitting management data to said central cellular radio.

37. A remote copier node for use in an apparatus for managing remotely located copier nodes, said node comprising:
   (a) a copier for producing copies;
   (b) a copy counting circuit, coupled to said copier, for maintaining a copy count of number of copies produced by said copier;
   (c) a remote cellular radio, coupled to said copy counting circuit, for receiving a copier management command and supplying said command to said copy counting circuit;
   (d) wherein, when said copier management command is a request for said copy count, said copy counting circuit supplies said copy count to said remote cellular radio to broadcast said copy count.

38. The apparatus of claim 37, wherein said copy counting circuit comprises:
   (a) a copy detector for receiving copy count pulses from said copier whenever it produces a copy;
   (b) a data storage medium for storing said copy count; and
   (c) a processor coupled to said copy detector, said data storage medium, and said remote cellular radio, said processor for incrementing said copy count in response to commands that said copy detector generates upon receiving said copy count pulses;
   (d) wherein, when said copier management command is a request for said copy count, said processor obtains said copy count from said data storage and commands said remote cellular radio to broadcast said copy count.

* * * * *